(12) United States Patent
Wang

(10) Patent No.: US 11,813,824 B2
(45) Date of Patent: Nov. 14, 2023

(54) COMPOSITE ARTICLES PROVIDING FLAME RETARDANCY AND NOISE REDUCTION

(71) Applicant: HANWHA AZDEL, INC., Forest, VA (US)

(72) Inventor: Ruomiao Wang, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 17/525,921

(22) Filed: Nov. 14, 2021

(65) Prior Publication Data

US 2022/0347981 A1    Nov. 3, 2022

Related U.S. Application Data

(63) Continuation of application No. 16/240,619, filed on Jan. 4, 2019, now Pat. No. 11,173,689.

(Continued)

(51) Int. Cl.
*B32B 27/08*    (2006.01)
*C08K 3/016*    (2018.01)
(Continued)

(52) U.S. Cl.
CPC ............ *B32B 27/08* (2013.01); *B29D 99/001* (2013.01); *B32B 3/14* (2013.01); *B32B 3/266* (2013.01); *B32B 5/02* (2013.01); *B32B 5/142* (2013.01); *B32B 5/18* (2013.01); *B32B 5/26* (2013.01); *B32B 7/12* (2013.01); *B32B 11/04* (2013.01); *B32B 21/02* (2013.01); *B32B 27/12* (2013.01); *B32B 27/18* (2013.01); *B32B 27/20* (2013.01); *B32B 27/281* (2013.01); *B32B 27/286* (2013.01); *B32B 27/30* (2013.01); *B32B 27/302* (2013.01); *B32B 27/304* (2013.01); *B32B 27/34* (2013.01); *B32B 27/36* (2013.01); *B32B 27/365* (2013.01); *B32B 37/10* (2013.01); *B32B 38/10* (2013.01); *B32B 38/164* (2013.01); *C08J 5/043* (2013.01); *C08J 9/0085* (2013.01); *C08K 3/016* (2018.01); *C08K 3/04* (2013.01); *C08K 3/22* (2013.01); *C08K 7/24* (2013.01); *C08L 23/12* (2013.01); *E04B 2/7403* (2013.01); *E04B 9/001* (2013.01); *E04B 9/045* (2013.01);
(Continued)

(58) Field of Classification Search
CPC .. B32B 5/18; B32B 3/14; B32B 3/266; B32B 27/18; B32B 5/20; B32B 5/26; B32B 27/08; B32B 38/16; B32B 38/164; B32B 38/166; B32B 37/10; C08K 3/04; C08K 3/016; C08K 2003/2224; C08J 9/0085; C08J 9/30; C08J 5/043; C08J 3/05; B29D 99/001; B29D 99/0021; E04B 2/7403; E04B 2/7409; E04B 2/7411

See application file for complete search history.

(56) References Cited

U.S. PATENT DOCUMENTS

2017/0129145 A1* 5/2017 Wang .................... B29C 44/128
2017/0225429 A1* 8/2017 Yu ......................... B32B 27/281

* cited by examiner

*Primary Examiner* — Kregg T Brooks
(74) *Attorney, Agent, or Firm* — Rhodes IP PLC; Christopher R Rhodes

(57) ABSTRACT

A thermoplastic composite article comprising a porous core layer and an open cell skin disposed on a first surface of the core layer is described. The composite article comprises a noise reduction coefficient of at least 0.5 as tested by ASTM C423-17 and a flame spread index of less than 25 and a smoke development index of less than 150 as tested by ASTM E84 dated 2009.

17 Claims, 18 Drawing Sheets

Related U.S. Application Data

(60) Provisional application No. 62/638,859, filed on Mar. 5, 2018, provisional application No. 62/614,038, filed on Jan. 5, 2018.

(51) Int. Cl.

| | |
|---|---|
| *B32B 5/18* | (2006.01) |
| *B32B 27/18* | (2006.01) |
| *C08J 5/04* | (2006.01) |
| *C08K 3/04* | (2006.01) |
| *C08K 3/22* | (2006.01) |
| *C08K 7/24* | (2006.01) |
| *C08L 23/12* | (2006.01) |
| *E04B 9/00* | (2006.01) |
| *E04B 9/04* | (2006.01) |
| *B32B 27/12* | (2006.01) |
| *B32B 27/28* | (2006.01) |
| *B32B 11/04* | (2006.01) |
| *B32B 3/14* | (2006.01) |
| *B32B 27/20* | (2006.01) |
| *B32B 27/30* | (2006.01) |
| *B32B 3/26* | (2006.01) |
| *B32B 27/36* | (2006.01) |
| *B32B 21/02* | (2006.01) |
| *B32B 27/34* | (2006.01) |
| *B32B 7/12* | (2006.01) |
| *B32B 5/26* | (2006.01) |
| *B32B 5/14* | (2006.01) |
| *B32B 5/02* | (2006.01) |
| *B32B 37/10* | (2006.01) |
| *B32B 38/00* | (2006.01) |
| *B32B 38/10* | (2006.01) |
| *B29D 99/00* | (2010.01) |
| *C08J 9/00* | (2006.01) |
| *E04B 2/74* | (2006.01) |
| *B32B 27/32* | (2006.01) |

(52) U.S. Cl.
CPC ......... *B32B 27/32* (2013.01); *B32B 2255/102* (2013.01); *B32B 2260/021* (2013.01); *B32B 2260/046* (2013.01); *B32B 2262/0261* (2013.01); *B32B 2262/0269* (2013.01); *B32B 2262/0276* (2013.01); *B32B 2262/062* (2013.01); *B32B 2262/065* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2264/108* (2013.01); *B32B 2264/12* (2013.01); *B32B 2270/00* (2013.01); *B32B 2305/026* (2013.01); *B32B 2307/102* (2013.01); *B32B 2307/3065* (2013.01); *B32B 2307/546* (2013.01); *B32B 2307/718* (2013.01); *B32B 2313/04* (2013.01); *B32B 2315/02* (2013.01); *B32B 2323/10* (2013.01); *B32B 2377/00* (2013.01); *B32B 2419/00* (2013.01); *B32B 2419/04* (2013.01); *B32B 2419/06* (2013.01); *B32B 2605/00* (2013.01); *B32B 2605/003* (2013.01); *B32B 2607/00* (2013.01); *C08K 2003/2224* (2013.01)

COMPOSITE ARTICLES PROVIDING FLAME RETARDANCY AND NOISE REDUCTION

RELATED APPLICATIONS

This application is related to, and claims priority to and the benefit of, each of U.S. Provisional Application No. 62/614,038 filed on Jan. 5, 2018 and U.S. Provisional Application No. 62/638,859 filed on Mar. 5, 2018, the entire disclosure of each of which is hereby incorporated herein by reference.

TECHNOLOGICAL FIELD

Certain examples described herein are directed to composite articles that provide both flame retardancy and noise reduction.

BACKGROUND

Composite materials have broad applications in different industries, such as building and construction, automotive, and recreational vehicles. To be used in these industries, the composite materials often need to meet certain performance characteristics.

SUMMARY

Certain aspects, embodiments, configurations and examples of lightweight reinforced thermoplastic (LWRT) composite articles that can provide both flame retardancy and noise reduction are described. While certain configurations are described as including certain components, the components can be rearranged, substituted or otherwise altered to provide articles with desired performance characteristics. In addition, other components, layers and material can be used on, in or with the illustrative components described herein.

In a first aspect, a thermoplastic composite article comprising a porous core layer comprising a web of open celled structures comprising a random arrangement of a plurality of reinforcing fibers held together by a thermoplastic material, wherein the porous core layer comprises a flame retardant agent and a basis weight of at least 2500 grams per square meter (gsm), e.g., at least 2800 gsm, is provided. In some examples, the composite article also comprises an open cell skin disposed on a first surface of the porous core layer, wherein the composite article comprises a noise reduction coefficient of at least 0.5 as tested by ASTM C423-17, and wherein the composite article comprises a flame spread index of less than 25 and a smoke development index of less than 150 as tested by ASTM E84 dated 2009.

In certain embodiments, the flame retardant agent comprises expandable graphite particles. In some examples, the open cell skin comprises a perforated film with an open surface area of at least 10%, and wherein the composite article comprises a noise reduction coefficient of at least 0.85 as tested by ASTM C423-17.

In other embodiments, the flame retardant agent comprises magnesium hydroxide. In some instances, the open cell skin comprises a perforated film with an open surface area of at least 10%, and wherein the composite article comprises a noise reduction coefficient of at least 0.85 as tested by ASTM C423-17.

In some examples, the thermoplastic material comprises a polyolefin resin. In other examples, the plurality of reinforcing fibers comprise glass fibers. In some embodiments, the composite article comprises a decorative layer disposed on a second surface of the porous core layer.

In other examples, the composite article comprises a closed cell skin disposed on a second surface of the porous core layer. In some examples, the composite article comprises a decorative layer disposed on the closed cell skin.

In another aspect, a ceiling tile comprises a porous core layer and an open cell skin disposed on the porous core layer. For example, the ceiling tile can comprise a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm. The ceiling tile may also comprise an open cell skin disposed on a first surface of the porous core layer, wherein the ceiling tile comprises a noise reduction coefficient of at least 0.5 as tested by ASTM C423-17, and wherein the ceiling tile comprises a flame spread index of less than 25 and a smoke development index of less than 150 as tested by ASTM E84 dated 2009.

In certain embodiments, the open cell skin comprises an open surface area of at least 10%, and wherein the ceiling tile comprises a noise reduction coefficient of at least 0.85 as tested by ASTM C423-17. In other embodiments, the ceiling tile further comprises a porous decorative layer disposed on the open cell skin. In some examples, the flame retardant agent comprises expandable graphite particles or magnesium hydroxide or both. In certain examples, the open cell skin comprises a perforated film with an open surface area of at least 10%, and wherein the ceiling tile panel comprises a noise reduction coefficient of at least 0.85 as tested by ASTM C423-17. In some embodiments, the ceiling tile comprises a closed cell skin disposed on a second surface of the porous core layer. In certain instances, the flame retardant agent is homogeneously dispersed in the porous core layer. In some examples, the thermoplastic material comprises a polyolefin resin. In certain examples, the plurality of reinforcing fibers comprise glass fibers or mineral fibers or both. In some embodiments, the porous core layer further comprises a clay.

In another aspect, a cubicle wall panel sized and arranged to couple to another cubicle wall panel is described. For example, the cubicle wall panel may comprise a porous core layer comprising a web of open celled structures comprising a random arrangement of a plurality of reinforcing fibers held together by a thermoplastic material, wherein the porous core layer comprises a flame retardant agent and a basis weight of at least 2500 gsm. e.g., at least 2800 gsm. The cubicle wall panel may also comprise an open cell skin disposed on a first surface of the porous core layer, wherein the cubicle wall panel comprises a noise reduction coefficient of at least 0.5 as tested by ASTM C423-17, and wherein the cubicle wall panel comprises a flame spread index of less than 25 and a smoke development index of less than 150 as tested by ASTM E84 dated 2009.

In some examples, the open cell skin comprises an open surface area of at least 10%, and wherein the cubicle wall panel comprises a noise reduction coefficient of at least 0.85 as tested by ASTM C423-17. In other examples, the cubicle wall panel comprises a porous decorative layer disposed on the open cell skin. In some examples, the flame retardant agent comprises expandable graphite particles or magnesium hydroxide or both. In further examples, the open cell skin comprises a perforated film with an open surface area of at least 10%, and wherein the cubicle wall panel comprises a noise reduction coefficient of at least 0.85 as tested by ASTM C423-17. In some instances, the cubicle wall panel comprises a closed cell skin disposed on a second surface of the porous core layer. In other examples, the flame retardant agent is homogeneously dispersed in the porous core layer. In some embodiments, the thermoplastic material comprises a polyolefin resin. In certain examples, the plurality of reinforcing fibers comprise glass fibers or mineral fibers or both. In some instances, the porous core layer further comprises a clay.

In an additional aspect, a structural panel comprises a porous core layer, an open cell skin and a structural substrate coupled to the porous core layer. The porous core layer can comprise a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm. The open cell skin can be coupled to a first surface of the porous core layer. The structural substrate can be coupled to a second surface of the porous core layer, wherein the structural panel comprises a flame spread index of less than 25 and a smoke development index of less than 150 as tested by ASTM E84 dated 2009, and wherein the structural panel provides a noise reduction coefficient of at least 0.85 as tested by ASTM C423-17.

In certain embodiments, the structural substrate comprises a plywood panel, a gypsum board, a wood tile, a ceramic tile, a metal tile, a wood panel, a concrete panel, a concrete board or a brick. In other embodiments, the open cell skin comprises an open surface area of at least 10%, and wherein the structural panel comprises a noise reduction coefficient of at least 0.85 as tested by ASTM C423-17. In some examples, the structural panel comprises a porous decorative layer disposed on the open cell skin. In certain examples, the flame retardant agent comprises expandable graphite particles or magnesium hydroxide or both. In some examples, the open cell skin comprises a perforated film with an open surface area of at least 10%, and wherein the structural panel comprises a noise reduction coefficient of at least 0.85 as tested by ASTM C423-17. In other examples, the structural panel comprises a closed cell skin disposed on a second surface of the porous core layer. In some embodiments, the flame retardant agent is homogeneously dispersed in the porous core layer. In certain examples, the thermoplastic material comprises a polyolefin resin and the plurality of reinforcing fibers comprise glass fibers or mineral fibers or both. In some examples, the structural panel comprises a second structural panel coupled to the open cell skin, wherein the second structural panel is a porous structural panel.

In another aspect, a wall panel comprises a porous core layer, an open cell skin and a wall substrate. The porous core layer comprises a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm. The open cell skin can be coupled to a first surface of the porous core layer. The wall substrate can be coupled to a second surface of the porous core layer and configured to support the porous core layer when the wall panel is coupled to a wall surface, wherein the wall panel comprises a flame spread index of less than 25 and a smoke development index of less than 150 as tested by ASTM E84 dated 2009, and wherein the wall panel comprises a sound absorption coefficient of at least 0.5 as tested by ASTM C423-17.

In some examples, the wall substrate is cellulose free. In other examples, the open cell skin comprises an open surface area of at least 10%, and wherein the wall panel comprises a noise reduction coefficient of at least 0.85 as tested by ASTM C423-17. In some examples, the wall panel comprises a porous decorative layer disposed on the open cell skin. In certain instances, the flame retardant agent comprises expandable graphite particles or magnesium hydroxide or both. In some examples, the open cell skin comprises a perforated film with an open surface area of at least 10%, and wherein the wall panel comprises a noise reduction coefficient of at least 0.5 as tested by ASTM C423-17. In other embodiments, the wall panel comprises a closed cell skin disposed on a second surface of the porous core layer. In some examples, the flame retardant agent is homogeneously dispersed in the porous core layer. In certain examples, the thermoplastic material comprises a polyolefin resin and the plurality of reinforcing fibers comprise glass fibers or mineral fibers or both. In some embodiments, the wall panel comprises a second wall panel coupled to the open cell skin, wherein the second wall panel is a porous wall panel.

In an additional aspect, a vinyl siding panel comprises a flame retardant and noise reducing layer and a vinyl substrate. In some examples, the flame retardant and noise reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin coupled to a first surface of the porous core layer, wherein the flame retardant layer comprises a flame spread index of less than 25 and a smoke development index of less than 150 as tested by ASTM E84 dated 2009, and wherein the flame retardant layer comprises a noise reduction coefficient of at least 0.5 as tested by ASTM C423-17. The vinyl substrate can be coupled to a first surface of the flame retardant and noise reducing layer and configured to couple to a non-horizontal surface of a building to retain the vinyl siding panel to the non-horizontal surface of a building.

In certain examples, the vinyl siding panel comprises a weather barrier coupled to a second surface of the flame retardant and noise reducing layer. In some examples, the vinyl substrate comprises a nailing flange. In other examples, the open cell skin comprises an open surface area of at least 10%, and wherein the vinyl siding comprises a noise reduction coefficient of at least 0.85 as tested by ASTM C423-17. In some examples, the flame retardant agent comprises expandable graphite particles or magnesium hydroxide or both. In certain embodiments, the open cell skin comprises a perforated film with an open surface area of at least 10%, and wherein the vinyl siding panel comprises a noise reduction coefficient of at least 0.85 as tested by ASTM C423-17. In some examples, the vinyl siding panel comprises a closed cell skin disposed on a second surface of the porous core layer. In other examples, the flame retardant agent is homogeneously dispersed in the porous core layer. In some instances, the thermoplastic material comprises a polyolefin resin and the plurality of reinforcing fibers comprise glass fibers or mineral fibers or both. In some embodiments, the vinyl siding panel comprises a second vinyl siding panel comprising a second flame retardant and noise reducing layer coupled to a second vinyl substrate, wherein the flame retardant and noise reducing layer is configured to lock into the second flame retardant and noise reducing layer when the vinyl substrate is coupled to the second vinyl substrate.

In another aspect, a roofing panel comprises a flame retardant and noise reducing layer and a roofing substrate. The a flame retardant and noise reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin coupled to a first surface of the porous core layer, wherein the flame retardant and noise reducing layer comprises a flame spread index of less than 25 and a smoke development index of less than 150 as tested by ASTM E84 dated 2009, and wherein the flame retardant and noise reducing layer comprises a noise reduction coefficient of at least 0.5 as tested by ASTM C423-17. The roofing substrate can be coupled to a first surface of the flame retardant and noise reducing layer and configured to couple to a roof of a dwelling to retain the roofing panel to the roof.

In certain embodiments, the roofing panel comprises a weather barrier coupled to a second surface of the flame retardant and noise reducing layer. In some examples, the roofing substrate comprises a cellulose-based material. In other examples, the open cell skin comprises an open surface area of at least 10%, and wherein the roofing panel comprises a noise reduction coefficient of at least 0.85 as tested by ASTM C423-17. In some embodiments, the flame retardant agent comprises expandable graphite particles or magnesium hydroxide or both. In some examples, the open cell skin comprises a perforated film with an open surface area of at least 10%, and wherein the roofing panel comprises a noise reduction coefficient of at least 0.85 as tested by ASTM C423-17. In some examples, the roofing panel comprises a closed cell skin disposed on a second surface of the porous core layer. In certain embodiments, the flame retardant agent is homogeneously dispersed in the porous core layer. In some examples, the thermoplastic material comprises a polyolefin resin and the plurality of reinforcing fibers comprise glass fibers or mineral fibers or both. In some embodiments, the roofing panel comprises a second roofing panel comprising a second flame retardant and noise reducing layer coupled to a second roofing substrate, wherein the flame retardant and noise reducing layer is configured to lock into the second flame retardant and noise reducing layer when the roofing substrate is positioned to overlap the second roofing substrate.

In an additional aspect, a roofing shingle comprises a flame retardant and noise reducing layer and a weatherproof roofing shingle substrate. In some examples, flame retardant and noise reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin coupled to a first surface of the porous core layer, wherein the flame retardant and noise reducing layer comprises a flame spread index of less than 25 and a smoke development index of less than 150 as tested by ASTM E84 dated 2009, and wherein the flame retardant and noise reducing layer comprises a noise reduction coefficient of at least 0.5 as tested by ASTM C423-17. The weatherproof roofing shingle substrate can be coupled to a first surface of the flame retardant and noise reducing layer and configured to couple to a roofing panel of a building to provide a weatherproof, flame retardant and noise reducing roofing shingle over the roofing panel.

In some examples, the roofing shingle comprises a weather barrier coupled to a second surface of the flame retardant and noise reducing layer. In some examples, the roofing shingle comprises asphalt. In other examples, the open cell skin comprises an open surface area of at least 10%, and wherein the roofing shingle comprises a noise reduction coefficient of at least 0.85 as tested by ASTM C423-17. In certain examples, the flame retardant agent comprises expandable graphite particles or magnesium hydroxide or both. In some embodiments, the open cell skin comprises a perforated film with an open surface area of at least 10%, and wherein the roofing shingle comprises a noise reduction coefficient of at least 0.85 as tested by ASTM C423-17. In some examples, the roofing shingle comprises a closed cell skin disposed on a second surface of the porous core layer. In certain embodiments, the flame retardant agent is homogeneously dispersed in the porous core layer. In certain examples, the thermoplastic material comprises a polyolefin resin and the plurality of reinforcing fibers comprise glass fibers or mineral fibers or both. In other examples, the roofing shingle comprises a second roofing shingle comprising a second flame retardant and noise reducing layer coupled to a second weatherproof roof shingle, wherein the flame retardant and noise reducing layer is configured to lock into the second flame retardant and noise reducing layer when the weatherproof roofing shingle is positioned to overlap the second weatherproof roof shingle.

In another aspect, a recreational vehicle interior panel comprises a flame retardant and sound reducing layer and an interior wall substrate. The flame retardant and sound reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin coupled to a first surface of the porous core layer. The interior wall substrate can be coupled to a second surface of the porous core layer, wherein the recreational vehicle interior panel comprises a flame spread index of less than 25 and a smoke development index of less than 150 as tested by ASTM E84 dated 2009, and wherein the recreational interior vehicle panel comprises a noise reduction coefficient of at least 0.5 as tested by ASTM C423-17.

In some examples, the interior wall substrate is configured as a decorative layer. In other examples, the open cell skin comprises an open surface area of at least 10%, and wherein the recreational vehicle interior panel comprises a noise reduction coefficient of at least 0.85 as tested by ASTM C423-17. In some embodiments, the flame retardant agent comprises expandable graphite particles or magnesium hydroxide or both. In certain examples, the open cell skin comprises a perforated film with an open surface area of at least 10%, and wherein the recreational vehicle interior panel comprises a noise reduction coefficient of at least 0.85 as tested by ASTM C423-17. In other examples, the recreational vehicle interior panel comprises a closed cell skin disposed on a second surface of the porous core layer. In other examples, the flame retardant agent is homogeneously dispersed in the porous core layer. In some examples, the thermoplastic material comprises a polyolefin resin and the plurality of reinforcing fibers comprise glass fibers or mineral fibers or both. In other examples, the recreational vehicle interior panel comprises a second recreational vehicle interior panel comprising a second flame retardant and noise reducing layer coupled to a second interior wall substrate, wherein the flame retardant and noise reducing layer is configured to lock into the second flame retardant and noise reducing layer when the interior wall substrate is positioned to vertically overlap the second interior wall substrate at a first side of the recreational vehicle interior panel. In additional examples, the recreational vehicle interior panel comprises a third recreational vehicle interior panel comprising a third flame retardant and noise reducing layer coupled to a third interior wall substrate, wherein the flame retardant and noise reducing layer is configured to lock into the third flame retardant and noise reducing layer when the interior wall substrate is positioned to vertically overlap the third interior wall substrate at a second side of the recreational vehicle interior panel.

In an additional aspect, a recreational vehicle exterior panel comprises a flame retardant and sound reducing layer and a weatherproof exterior wall substrate. The flame retardant and sound reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin coupled to a first surface of the porous core layer. The weatherproof exterior wall substrate can be coupled to a second surface of the porous core layer, wherein the recreational vehicle exterior panel comprises a flame spread index of less than 25 and a smoke development index of less than 150 as tested by ASTM E84 dated 2009, and wherein the recreational exterior vehicle panel comprises a noise reduction coefficient of at least 0.5 as tested by ASTM C423-17.

In some examples, the exterior wall substrate comprises glass fibers or is configured as a metal panel. In other examples, the open cell skin comprises a perforated film with an open surface area of at least 10%, and wherein the recreational vehicle exterior panel comprises a noise reduction coefficient of at least 0.85 as tested by ASTM C423-17. In additional examples, the flame retardant agent comprises expandable graphite particles or magnesium hydroxide or both. In other embodiments, the open cell skin comprises a perforated film with an open surface area of at least 10%, and wherein the recreational vehicle exterior panel comprises a noise reduction coefficient of at least 0.85 as tested by ASTM C423-17. In some examples, the recreational vehicle exterior panel comprises a closed cell skin disposed on a second surface of the porous core layer. In other examples, the flame retardant agent is homogeneously dispersed in the porous core layer. In some embodiments, the thermoplastic material comprises a polyolefin resin and the plurality of reinforcing fibers comprise glass fibers or mineral fibers or both. In other examples, the recreational vehicle exterior panel comprises a second recreational vehicle exterior panel comprising a second flame retardant and noise reducing layer coupled to a second exterior wall substrate, wherein the flame retardant and noise reducing layer is configured to lock into the second flame retardant and noise reducing layer when the exterior wall substrate is positioned to overlap the second exterior wall substrate at a first side of the recreational vehicle exterior panel. In some examples, the recreational vehicle exterior panel comprises a third recreational vehicle exterior panel comprising a third flame retardant and noise reducing layer coupled to a third exterior wall substrate, wherein the flame retardant and noise reducing layer is configured to lock into the third flame retardant and noise reducing layer when the exterior wall substrate is positioned to overlap the third exterior wall substrate at a second side of the recreational vehicle exterior panel.

In another aspect, an interior building panel comprising a two- or three-dimensional feature is provided. In some examples, the interior building panel comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin disposed on a first surface of the porous core layer, wherein the interior building panel comprising the two- or three-dimensional feature comprises a noise reduction coefficient of at least 0.5 as tested by ASTM C423-17, and wherein the interior building panel comprising the two- or three-dimensional feature comprises a flame spread index of less than 25 and a smoke development index of less than 150 as tested by ASTM E84 dated 2009.

In an additional aspect, an interior trim article is described. The interior trim may comprise, for example, a flame retardant and noise reducing layer and an interior trim substrate. The flame retardant and noise reducing layer comprises a porous core layer comprising a web of open celled structures comprising a random arrangement of a plurality of reinforcing fibers held together by a thermoplastic material, wherein the porous core layer comprises a flame retardant agent and a basis weight of at least 2500 gsm, e.g., at least 2800 gsm, and an open cell skin disposed on a first surface of the porous core layer, wherein the flame retardant and noise reducing layer comprises a noise reduction coefficient of at least 0.5 as tested by ASTM C423-17, and wherein the flame retardant and noise reducing layer comprises a flame spread index of less than 25 and a smoke development index of less than 150 as tested by ASTM E84 dated 2009. The interior trim substrate can be coupled to a first surface of the flame retardant and noise reducing layer. The interior trim can be, for example, base molding, crown molding, door molding, chair rail, window molding or other interior trim articles.

Additional aspects, configurations, embodiments, examples and features are described in more detail below.

BRIEF DESCRIPTION OF THE SEVERAL VIEWS OF THE DRAWINGS

Certain illustrative configurations of composite articles are described with reference to the figures in which.

Figure 1:
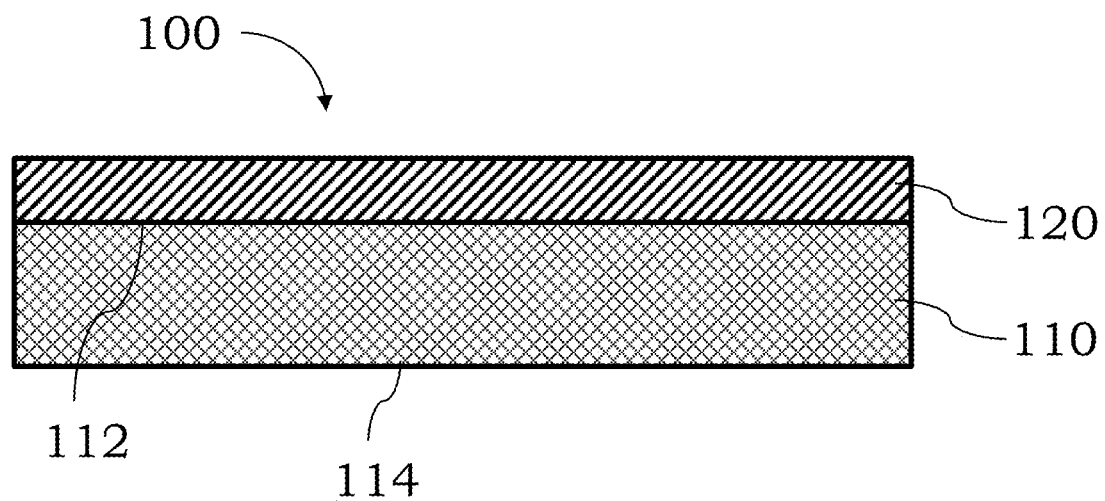
FIG. 1 is an illustration of a composite article comprising a prepreg or core layer coupled to an open cell skin on one surface, in accordance with certain configurations.

It will be recognized by the person of ordinary skill in the art, given the benefit of this disclosure, that the illustrative representations shown in FIGS. 1-21 are provided for convenience and to facilitate a better understanding. The exact shape, length, width, thickness, geometry and overall orientation of the components in the figures may vary depending on the intended use and desired properties.

DETAILED DESCRIPTION

Examples of some configurations of composite articles are described that may comprise two or more layers coupled to each other. While various layers are shown in the figures and are described below, the thickness, size and geometry of the different layers need not be the same and may be other thicknesses, size and geometries than those shown in the figures. Further, the exact arrangement or layering of the components can be altered or intermediate layers may be present between the illustrative layers shown in the figures.

In certain embodiments, the articles described herein generally comprise a prepreg or core layer coupled to another layer. A prepreg can be a non-fully formed core layer and may comprise materials that are processed from a final core layer. For example, the prepreg may comprise thermoplastic materials in combination with reinforcing fibers but may not be fully formed or may be present in a softened state by application of heat. The prepreg may be pressed, compressed or molded into a desired shape to provide a core layer. The other layers coupled to the prepreg layer may be added prior to fully forming the core or after fully forming the core. The other layers can be coupled to the prepreg or core layer using an adhesive or, in some instances, the prepreg or core layer may be directly coupled to other layers without the use of any adhesive material between the prepreg or core layer and the other layers.

In certain examples, the prepregs or core layers can be used in a lightweight reinforced thermoplastic (LWRT) article. LWRT's can provide certain desirable attributes including, but not limited to, high stiffness-to-weight ratio, low part weight, simple and low-cost part forming process, low coefficient of thermal expansion, recyclability, and others. LWRT have broad applications in the automotive industry, including different kinds of soft trims for both interior and exterior applications. Recreational vehicles, commercial truck trailers, and similar applications represent another category of the broad applications of LWRT articles. Ceiling tiles, office panels, cubicle panels and building and construction industries may also use the LWRT articles described herein.

In some examples, the LWRT articles described herein can provide a desired level of flame retardancy and acoustic absorption or noise reduction. For example, certain articles described herein can meet either the FMVSS 302 test or the SAE J369 test standard. These tests are generally equivalent and are used to determine burning rate measurements. In brief, the tests use a horizontal flame chamber, a fume hood, a tote large enough to handle specimens of about 12 inches in length, a water source, a timer, a lighter and a ruler. The specimen size is about 4 inches by about 12 inches with 5 or more specimens typically being tested. The adhesive side of the specimen is typically subjected to the flame. For FMVSS 302 tests, the fume hood is typically opened enough to provide an air flow of about 150 cubic feet per minute. For the SAE J369 test, the fume hood, for example, may be opened to provide the same air flow or may be opened all the way. Unless otherwise noted herein, the FMVSS 302 test can be interchanged with the SAE J369 test. The results of these tests can be classified in several ways including DNI, SE/0, SE/NBR, SE/B, B, and RB. DNI refers to the material not supporting combustion during or following a 15 second ignition period and/or the material not transmitting a flame front across either surface to a selected distance. SE/0 refers to the material igniting on the surface, but the flame extinguishes itself before it moves a selected distance. SE/NBR refers to the material stopping burning before it has burned for 60 seconds from the start of timing and not burning more than about 50 mm from the point where timing was started. SE/B refers to the leading flame front progressing a selected distance but extinguishing itself before reaching a second distance. B refers to the material burning the entire distance. RB refers to the materials that burn so rapidly it is not possible to time the burning rate. One or more of burn distance, burn time, burn rate, and whether the material is self-extinguishing may also be measured. Specimens may be considered to "meet" or "pass" the FMVSS 302 or SAE J369 tests if the flame travels less than about 102 mm per minute. Specimens may fail the tests if they burn faster than 102 mm per minute.

In some configurations described herein, the presence of a flame retardant material in a thermoplastic prepreg or a thermoplastic core permits the prepreg or core to provide flame retardancy to at least some degree. For example, the prepreg or core (and composite articles including the prepreg or core layer) may meet the Class A standard of ASTM E84 test dated 2009 and entitled "Standard Test Method for Surface Burning Characteristics of Building Materials"). The particular flame retardant material selected for use in the core layer may provide an article that meets the ASTM E84 class A or class B requirements in an as-produced article, e.g., without any molding, or in a molded article if desired. Class A articles differ from class B articles in that class A articles have a flame spread index of about 0-25 whereas class B articles have a flame spread index of about 26-75. In some instances, enough of the flame retardant material is present in the final prepreg or core so the prepreg or core meets the class A standard under the ASTM E84 test dated 2009.

In certain examples, the LWRT articles described herein may also provide acoustic absorption or noise reduction in addition to being flame retardant. Various different acoustic measurement tests can be performed to assess noise reduction including ASTM C423-17 entitled "Standard Test Method for Sound Absorption and Sound Absorption Coefficients by the Reverberation Room Method." For example, sound absorption average (SAA) values can be measure based on the absorption at sets of frequencies. Similar to SAA, NRC (noise reduction coefficient) is also based on a set of frequencies. The sound absorption average (SAA) is defined as a single number rating, the average, rounded to the nearest 0.01, of the sound absorption coefficient of a material for the twelve one-third octave bands from 200 through 2500 Hz, inclusive. The noise reduction coefficient (NRC) is defined from previous versions of this same test method as the average of the coefficients at 250, 500, 1000, and 2000 Hz, expressed to the nearest integral multiple of 0.05. In NRC/SAA tests, the specimen mounting method is also specified and is described in the ASTM E795-16 Type E 400 mounting method.

In certain configurations of the articles described herein, the articles may provide both flame retardancy and noise reduction. It will be recognized by the person of ordinary skill in the art, given the benefit of this disclosure, that the exact level of flame retardancy and noise reduction can depend on the materials used in the composite articles and their placement and orientation relative to incoming sound waves and/or potential heat or flame sources. In some instances and referring to FIG. 1, an article 100 is shown that comprises a prepreg or core layer 110 coupled to an open cell skin 120. The skin 120 is disposed on a first surface 112 of the prepreg or core layer 110. In FIG. 1, the surface 114 can be open and may not include any other layer or material disposed on it. As noted herein, the skin 120 can be disposed and coupled directly to the prepreg or core layer 110, e.g., without using any adhesive material, or adhesive, spot welding or melting or other materials and techniques can instead be used to hold the skin 120 to the prepreg or core layer 110.

In certain examples, the prepreg or core layer 110 may comprise a thermoplastic material and reinforcing fibers, which can be held in place in the general form of a web by the thermoplastic material. The fibers are generally arranged in a random fashion without any specific orientation or configurations. In certain examples, the thermoplastic material of the prepreg or core may be present in fiber form, particle form, resin form or other suitable forms. In some instances, the thermoplastic material used in the prepreg can be present in particle form and have an average particle size that is substantially the same as the average particle size of the flame retardant material. While not wishing to be bound by any particular scientific theory, by matching the particles sizes of the thermoplastic material and the flame retardant material, enhanced processing of the prepregs or cores including, for example, increased loading of the flame retardant material in the prepreg or core can be achieved. In some instances, the average particle size of the flame retardant material and the average particle size of the thermoplastic material can vary by about 5% to about 10% and enhanced processing can still be achieved. In certain configurations, the average particle size of each of the thermoplastic material and the flame retardant material in the prepreg can differ by about 50 microns to about 100 microns. In some configurations, the average particle size of the flame retardant material is at least 50% of the average particle size of the thermoplastic material particles to provide for enhanced processing. In other instances, flame retardant material with an average particle size about the same as the average particle size of the thermoplastic material can be present along with flame retardant material of an average particle size that is different than the average particle size of the thermoplastic material. Even though the average particle size of the flame retardant material may differ, the chemical composition of the flame retardant material can be the same or can be different. In yet other configurations, two or more thermoplastic materials with different average particle sizes can be present. If desired, two flame retardant materials with average particle sizes that are substantially the same as the average particle sizes of the thermoplastic materials can be present. The two flame retardant materials may be chemically the same or may be chemically distinct. Similarly, the thermoplastic materials can be chemically the same (but have a different average particle size) or can be chemically distinct. In certain instances, the virgin or native thermoplastic material used to produce the prepreg or core may be the same thermoplastic material that is present in a compounded flame retardant material, e.g., a mixture of flame retardant agent and a thermoplastic material. In other instances, the compounded flame retardant material may comprise two or more thermoplastic materials where one of the thermoplastic materials is the same as the virgin thermoplastic material used to produce the prepreg.

In certain embodiments, the prepreg or core 110 generally comprises a substantial amount of open cell structure such that void space is present in the prepreg. For example, the prepreg or core 110 may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg comprises a porosity or void content of greater than 0%, e.g., is not fully consolidated, up to about 95%. Unless otherwise stated, the reference to the prepreg or core comprising a certain void content or porosity is based on the total volume of the prepreg or core and not necessarily the total volume of the prepreg or core plus any other materials or layers coupled to the prepreg or core.

In certain embodiments, the high porosity present in the prepreg permits trapping of sound waves within the open structure of the prepreg or core layer and can trap flame retardant material within the pores or voids. For example, flame retardant material can reside in the void space in a non-covalently bonded manner. The presence of the flame retardant material in the void space can provide for enhance flame retardancy, and the presence of void space in general can act to absorb and/or deflect sound waves within the prepreg or core 110. The flame retardant material can also be coated onto a surface of the prepreg to provide enhanced flame retardancy.

In certain embodiments, the thermoplastic material of the prepreg or core 110 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the prepreg or core 110 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg or core 110 can vary and illustrative amounts range from about 20% by weight to about 80% by weight.

In certain examples, the reinforcing fibers of the prepreg or core 110 described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers, e.g., may be chemically treated so that they can react with the thermoplastic material, the flame retardant material or both. Alternatively, the flame retardant material can be reacted with the thermoplastic material of the prepreg or core 110 to provide a derivatized thermoplastic material that is then mixed with the fibers. The total fiber content in the prepreg or core 110 may be from about 20% to about 90% by weight of the prepreg, more particularly from about 30% to about 70%, by weight of the prepreg. Typically, the fiber content of a composite article comprising the prepreg or core 110 varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the prepreg or core 110 may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices.

In some configurations, the prepreg or core 110 may be a substantially halogen free or halogen free prepreg to meet the restrictions on hazardous substances requirements for certain applications. In other instances, the prepreg may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg), more particularly about 1 weight percent to about 13 weight percent, e.g., about 5 weight percent to about 13 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg or core), more particularly about 1 weight percent to about 15 weight percent, e.g., about 2 weight percent to about 14 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In other configurations described herein and as noted above, the composite article may comprise a flame retardant material such that the composite article meets ASTM E84 or the SAE J369 method (REV. November 2007). This test method is referred to in certain instances in the description and claims as a SAE flammability test or a SAE self-extinguishing test. In some examples, less than 10 weight percent flame retardant materials, less than 9 weight percent flame retardant materials, less than 8 weight percent flame retardant materials, less than 7 weight percent flame retardant materials, less than 6 weight percent flame retardant materials or even less than 5 weight percent flame retardant materials can be present in the prepreg or core layer so the composite article meets or passes the non-oil soaked and oil-soaked SAE flammability tests.

In certain embodiments, the flame retardant agent may comprise many different materials including organic and inorganic flame retardant materials. In certain examples, expandable graphite materials can be used in the prepreg or core 110 and may comprise one or more graphene based materials typically present in stacked molecular layers. While not wishing to be bound by any particular theory, in addition to providing lofting capabilities, the expandable graphite materials also can provide some degree of flame retardancy. In some embodiments, enough expandable graphite materials is present, e.g., a flame retardant amount of expandable graphite materials is present, in the prepreg or core 110 such that the prepreg or core 110 meets the ASTM E84 test dated 2009 or meets the Federal Motor Vehicle Safety Standard 302 (FMVSS 302) flammability test dated 1991, which is generally equivalent to ISO 3795 dated 1989 and ASTM D5132 dated 2004. Such flame retardant amounts can permit construction of a prepreg or core 110 that is substantially free of external flame retardant agents. The exact type of expandable graphite materials used in the prepreg can depend on numerous factors including, for example, the desired lofting temperature, the desired flame retardancy, desired acoustic performance, etc. Illustrative commercially available expandable graphite materials are available from Nyacol Nano Technologies, Inc. (Ashland, MA) and include, for example, grades 35, 200, 249, 250, 251, KP251 and 351 expandable graphite materials. Additional expandable graphite material can be purchased commercially from Graftech International (Lakewood, OH). While not wishing to be bound by any particular reaction, expandable graphite material can generally be produced by acidifying a graphite ore. Acidification results in an intercalation process, e.g., where sulfuric acid acts as an intercalator. The solution can then be neutralized to provide a series of layers of sheets of hexagonal carbon-carbon bonded materials. The layers are generally flat and interact with additional hexagonal carbon-carbon layers to provide a layered sheet structure. The layered sheet structure can be held together through covalent bonding or electrostatic interactions (or both) between sheets. Heating of the expandable graphite material in the thermoplastic prepreg or core 110 described herein can result in increased separation between layers and a resulting increase in thickness of the prepreg. If desired, the expandable graphite material can be oxidized using a suitable oxidant to form a graphene oxide. As noted herein, the expandable graphite material can be present in many forms including flake form, particle form or other forms. In some instances, the expandable graphite material is present in particle form and may comprise an average particle size of at least 300 microns, for example.

In certain configurations, the flame retardant agent may comprise an inorganic material or inorganic salt. For example, restrictions on hazardous substances (RoHS) may make it desirable to select the flame retardant material as an inorganic salt that is substantially free (or free) of any halides. In some embodiments, the flame retardant material may comprise a group II metal or a group III metal in combination with one or more anions. For example, the flame retardant material may comprise beryllium, calcium, magnesium or other Group II metal salts. In some embodiments, the Group II metal of the flame retardant material may be present as a hydroxide material. For example, the flame retardant material may be present as beryllium hydroxide, calcium hydroxide, magnesium hydroxide (MDH) or other group II metal hydroxides. In other instances, the flame retardant material may comprise aluminum, gallium, indium or other Group III metal salts. In some embodiments, the Group III metal salt of the flame retardant material may be present as a hydroxide material. For example, the flame retardant material may be present as aluminum hydroxide (ATH) or gallium hydroxide or other group III metal hydroxides. In other configurations, the inorganic material present as a flame retardant material may comprise one or more transition metal salts which can function as flame retardant materials. For example, transition metals which can form divalent cations in solution may be combined with one or more anions and used as flame retardant agents. In some instances, the transition metal salt may be present in non-halide form, e.g., may not be present as a fluoride, chloride, bromide or iodide salt, to avoid outgassing of toxic gases should the prepreg or core undergo burning. In certain configurations, the transition metal salt may be present, for example, as a hydroxide.

The exact amount of the flame retardant material used in the prepregs and cores may vary depending on which other materials are present, but the flame retardant material typically is present at a weight percentage less than a major amount of the prepreg or core, e.g., the flame retardant material is typically present at 50 weight percent or less based on the weight of the prepreg or core. In certain instances, the flame retardant material is present above a minor amount to provide flame retardancy to the prepreg or core. For example, the flame retardant material may be present at 30 weight percent or more, 35 weight percent or more, 40 weight percent or more or even 45 weight percent or more based on the weight of the prepreg or core. For example, the flame retardant material:other material ratio may vary from 1:1, 2:1 3:1, 4:1:5:1, 1:5, 1:4, 1:3 or 1:2.

Depending on the particular process used to produce the prepregs or core, the flame retardant material can be ground, filtered, sized or otherwise processed prior to adding it to the other materials of the prepreg or core. In some instances where thermoplastic particles are used in the prepreg or core, the average particle size of the flame retardant material may be about the same as the average particle size of the thermoplastic material. In other configurations, the average particle size of the flame retardant material may be smaller or larger than the average particle size of the thermoplastic material used in the prepreg or core.

In certain configurations, a porous prepreg or core comprising one or more thermoplastic materials and a plurality of fibers that together provide an open cell structure, e.g., void space, can be produced. In some configurations, flame retardant materials, e.g., EG materials, Group II metal salts, Group III metal salts, etc. can be loaded into the void space in a manner where the flame retardant materials reside (at least in part) within the void space formed by crossing over of the fibers, which can be held in place by the thermoplastic material. In some instances, the thermoplastic materials and/or the fibers can be selected so that they are generally inert or non-reactive with the flame retardant materials. In some examples, the flame retardant materials may not covalently bond to the thermoplastic material and/or the fibers, but there may be an association between any charged flame retardant material with the thermoplastic material of the porous prepreg. For example, weak interactions such as van der Waals' interactions or electrostatic interactions can take place between the flame retardant material and the other components of the prepreg or core.

In certain embodiments, the open cell skin 120 generally comprises a sufficient amount of open surface area to permit entry of sound waves into the prepreg or core 110. The open structure may exist within the film itself, e.g., by way of a network of cross-linked materials in the film, or may be provided by processing a film using suitable methods including creating perforations, slits, apertures, opening, punches or other structures which will increase the open surface area of the film. In some examples, the open cell skin comprises an open surface area of at least 5,%, 6%, 7%, 8%, 9%, 10%, 11%, 12%, 13%, 14%, 15% or more (based on the overall surface area of the skin). In some instances, the open surface area of the skin is selected to provide a desired noise reduction coefficient but is not so open that it lacks proper structure to function as a film.

In some instances, the materials used in the open cell skin may be a polyolefin, a co-polymer comprising a polyolefin, a polyamide, a co-polymer comprising a polyamide, or combinations thereof. The exact basis weight of the open cell skin or open cell film may vary from about 10 gsm to about 150 gsm, e.g., about 70-120 gsm or about 80-110 gsm or about 85-100 gsm, though the open cell skin or open cell film may be lighter or heavier depending on the exact open surface area present. In some instances, the open cell skin may take the form of an open cell film, an open cell scrim, an open cell frim (film+scrim) or other open cell layers. For example, the open cell skin may comprise an open cell polyethylene film, an open cell polypropylene film or an open cell polyamide film or combinations thereof.

In certain embodiments and as noted herein, the open cell skin and the prepreg or core can together provide both flame retardancy and noise reduction. For example, when used together, the open cell skin and prepreg or core layer may provide an article with a noise reduction coefficient of at least 0.5 as tested by ASTM C423-17, a flame spread index of less than 25 and a smoke development index of less than 150 as tested by ASTM E84 dated 2009. In other configurations, the open cell skin and prepreg or core layer may together provide an article with a noise reduction coefficient of at least 0.65 as tested by ASTM C423-17, a flame spread index of less than 25 and a smoke development index of less than 150 as tested by ASTM E84 dated 2009. In some examples, the open cell skin and prepreg or core layer may together provide an article with a noise reduction coefficient of at least 0.75 as tested by ASTM C423-17, a flame spread index of less than 25 and a smoke development index of less than 150 as tested by ASTM E84 dated 2009. In additional examples, the open cell skin and prepreg or core layer may together provide an article with a noise reduction coefficient of at least 0.85 as tested by ASTM C423-17, a flame spread index of less than 25 and a smoke development index of less than 150 as tested by ASTM E84 dated 2009. In other examples, the open cell skin and prepreg or core layer may together provide an article with a noise reduction coefficient of at least 0.85 as tested by ASTM C423-17, a flame spread index of less than 25 and a smoke development index of less than 150 as tested by ASTM E84 dated 2009. In some examples, the open cell skin and prepreg or core layer may together provide an article with a noise reduction coefficient of at least 0.88 or 0.9 as tested by ASTM C423-17, a flame spread index of less than 25 and a smoke development index of less than 150 as tested by ASTM E84 dated 2009.

Figure 2:
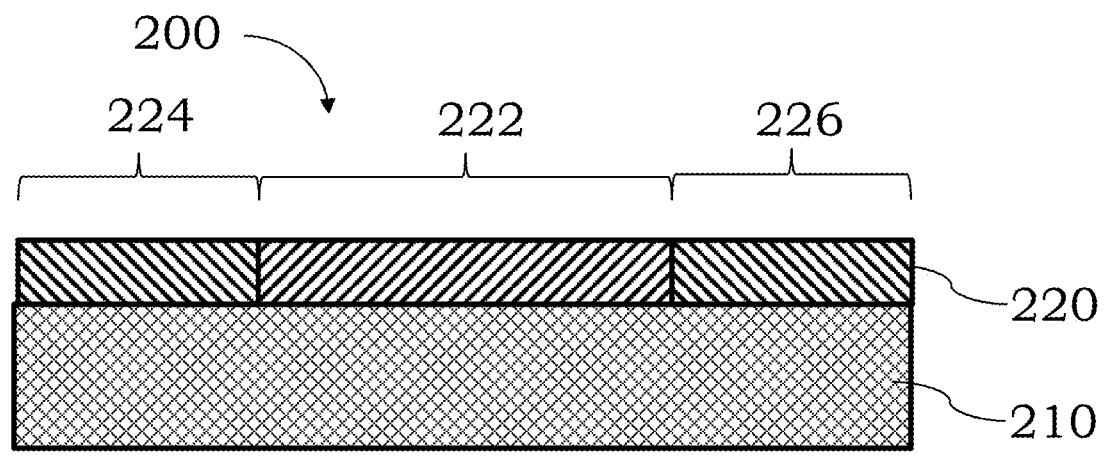
FIG. 2 is an illustration of a composite article comprising a prepreg or core layer coupled to an open cell skin on one surface where different areas of the open cell skin comprise a different porosity or permeability, in accordance with certain configurations.

In certain embodiments, the open cell skin need not have the same porosity or structure across an entire planar surface of the film. Referring to FIG. 2, an article 200 comprises a prepreg or core layer 210 and an open cell skin 220 disposed on a surface of the layer 210. The open cell skin 220 comprises an area 222 with a first open surface area and areas 224, 226 with a different surface area than the area 222. The open surface area of the areas 224, 226 need not be the same though they may be the same. In some instances, the open surface area at areas 224, 226 is greater than the open surface area at area 222, whereas in other instances the open surface area at areas 224, 226 is less than the open surface area at area 222. For example, where the composite article is used as a cubicle panel, ceiling tile or wall structure, the areas at the edges of the article may not need to provide the same noise reduction coefficient as the central portion of the article. In other instances, it may be desirable to vary the open surface area across a planar surface of the skin 220 to provide different noise reduction coefficients at different frequencies. For example, where the article is configured for use in movie theater ceiling tiles, it may be desirable to configure the skin 220 to comprise different noise coefficient reductions at different areas so the skin 220 provides variable noise reduction. The prepreg or core layer 210 may comprise any of those components described in reference to the prepreg or core layer 110 and generally is configured as a "heavy" layer with an areal weight of at least 2000 gsm or at least 2100 gsm or at least 2200 gsm or at least 2300 gsm or at least 2400 gsm or at least 2500 gsm. For example, the prepreg or core layer 210 may comprise one or more thermoplastic materials, a flame retardant material and reinforcing fibers randomly arranged in the prepreg or core layer 210.

Figure 3:
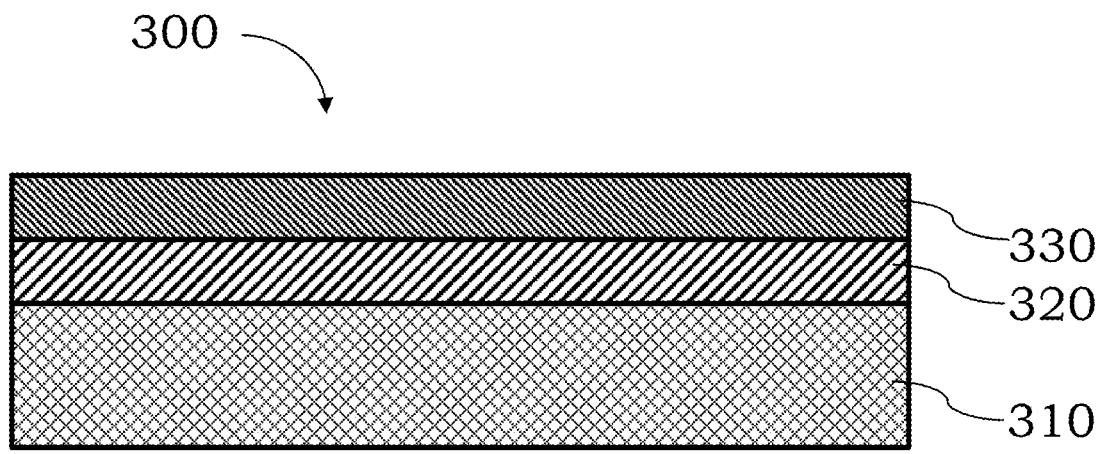
FIG. 3 is an illustration of a composite article comprising a prepreg or core layer coupled to an open cell skin on one surface and a second open cell skin coupled to the open cell skin, in accordance with certain configurations.

In other examples, two or more different open cell skins can be layered on a core layer. Referring to FIG. 3, a composite article 300 comprises a prepreg or core layer 300, a first open cell skin 320 disposed on the prepreg or core layer 320 and a second open cell skin 330 disposed on the first open cell skin 320. In some instances, the first skin 320 may comprise a higher open surface area than an open surface area of the second skin 330, whereas in other instances, the first skin 320 may comprise a lower open surface area than the open surface area of the second skin 330. If desired, the skins 320, 330 can be melted or coupled to each other to provide a single composite skin layer prior to disposing the skins 320, 330 on the prepreg or core layer 310. In addition, more than two skin layers can be coupled to each other if desired. In some examples, the outermost skin may have the highest open surface area to permit sound waves to enter in the layered skin structure with the skin closer to the prepreg or core layer 320 having a lower open surface area than the outer film layers. This illustrative skin arrangement can permit capture or more sound waves within the layered skin structure and the prepreg or core layer 310 than when only a single skin layer is used. The prepreg or core layer 310 may comprise any of those components described in reference to the prepreg or core layer 110 and generally is configured as a "heavy" prepreg or core layer with an areal weight of at least 2000 gsm or at least 2100 gsm or at least 2200 gsm or at least 2300 gsm or at least 2400 gsm or at least 2500 gsm. For example, the prepreg or core layer 310 may comprise one or more thermoplastic materials, a flame retardant material and reinforcing fibers randomly arranged in the prepreg or core layer 310.

Figure 4A:
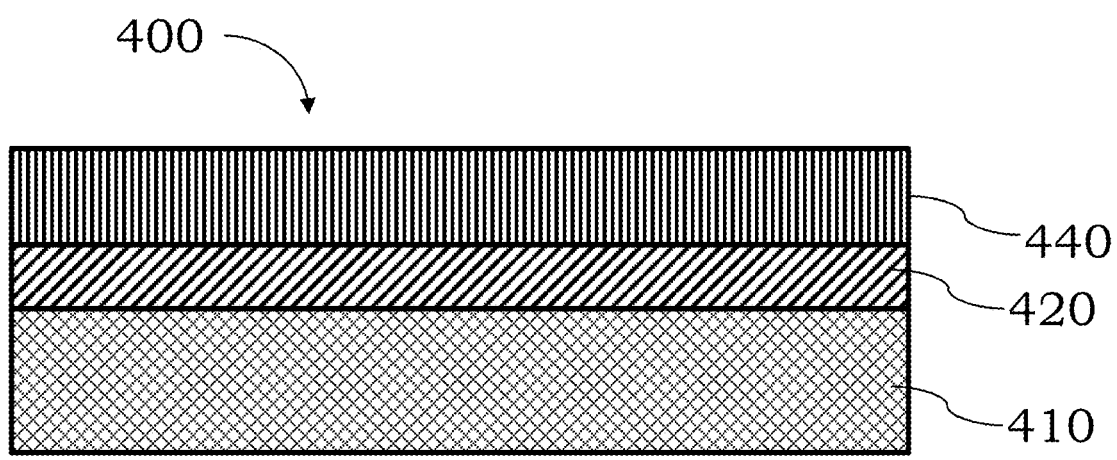
FIG. 4A is an illustration of a composite article comprising a prepreg or core layer coupled to an open cell skin on one surface and including a surface layer disposed on the open cell skin, in accordance with certain examples.
Figure 4B:
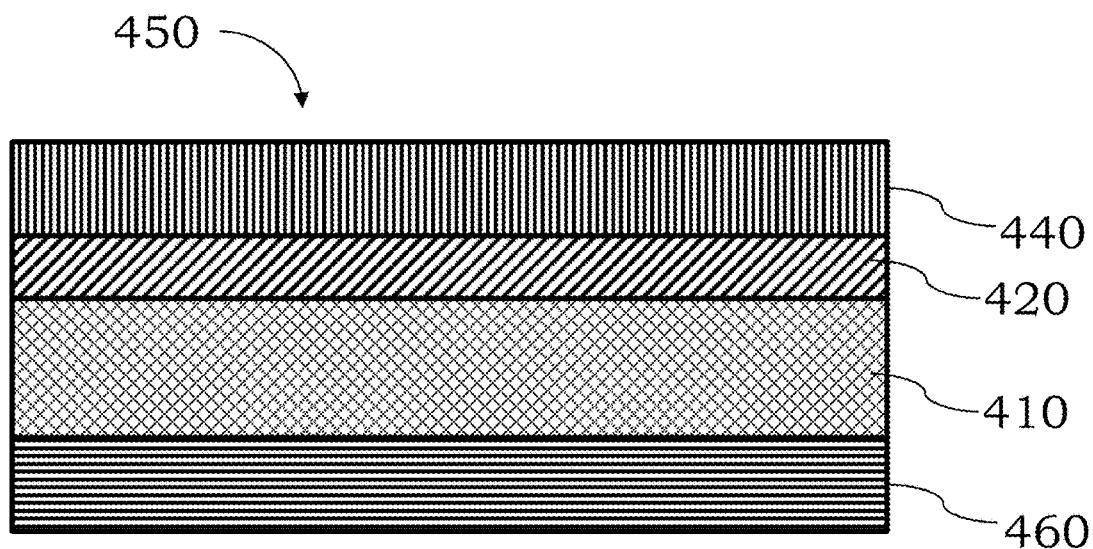
FIG. 4B is an illustration of a composite article comprising a prepreg or core layer coupled to an open cell skin on one surface and including a surface layer disposed on the open cell skin and another surface layer disposed on the prepreg or core layer, in accordance with certain examples.

In some configurations, one or more non-film layers can be coupled to the open cell skin. Referring to FIG. 4, an article 400 comprises a prepreg or core layer 410 with an open cell skin 420 disposed on the prepreg or core layer 410. A surface layer 440 or skin is disposed on the open cell skin 420. As noted in more detail below, the surface layer 440 can take many different configurations and is desirably porous or open to permit sound waves to enter into the composite article 400 through the surface layer 440 and into the skin 420 and core layer 410.

The layer 440 may comprise, for example, a scrim (e.g., fiber based scrim), a foil, a woven fabric, a non-woven fabric or be present as an inorganic coating, an organic coating, or a thermoset coating disposed on the prepreg or core 410. In other instances, the layer 440 may comprise a limiting oxygen index greater than about 22, as measured per ISO 4589 dated 1996. Where a fiber based scrim is present as (or as part of) the layer 440, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 440, the coating may comprise at least one of unsaturated polyurethanes, vinyl esters, phenolics and epoxies. Where an inorganic coating is present as (or as part of) the layer 440, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 440, the non-woven fabric may comprise a thermoplastic material, a thermal setting binder, inorganic fibers, metal fibers, metallized inorganic fibers and metallized synthetic fibers.

If desired, a second surface layer or skin can be present on an opposite surface of the core layer 410. For example and referring to FIG. 4B, a second surface layer 460 is disposed on an opposite surface of the prepreg or core layer 410 to provide a composite article 450. The second surface layer 460 can be the same or different than the surface layer 440 and may be any one or more of those materials described in reference to the surface layer 440. The prepreg or core layer 410 may comprise any of those components described in reference to the prepreg or core layer 110 and generally is configured as a "heavy" prepreg or core layer with an areal weight of at least 2000 gsm or at least 2100 gsm or at least 2200 gsm or at least 2300 gsm or at least 2400 gsm or at least 2500 gsm. For example, the prepreg or core layer 410 may comprise one or more thermoplastic materials, a flame retardant material and reinforcing fibers randomly arranged in the prepreg or core layer 410.

Figure 5:
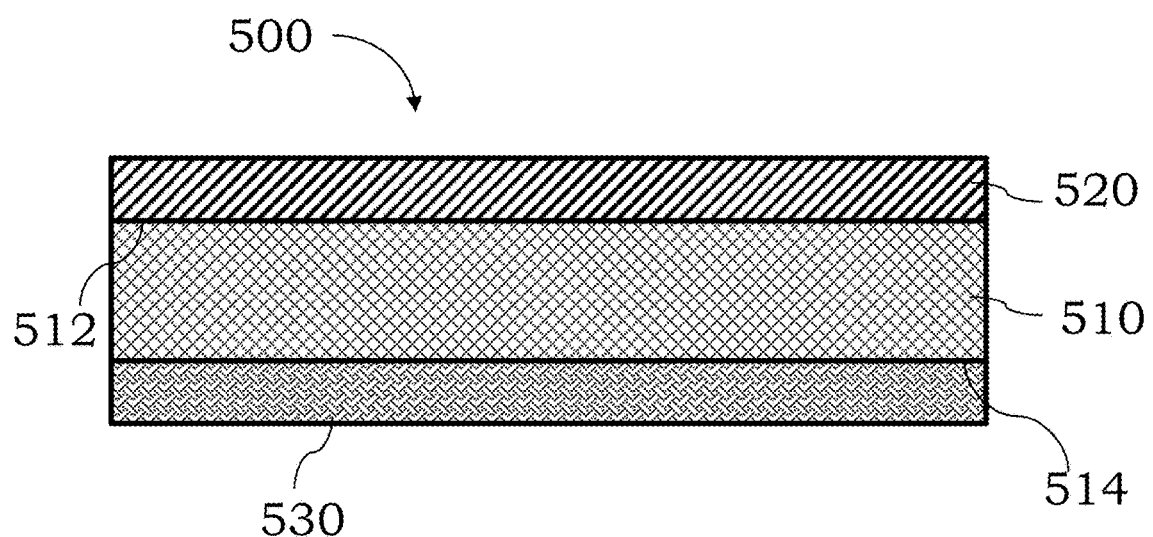
FIG. 5 is an illustration of a composite article comprising a prepreg or core layer coupled to an open cell skin on one surface and coupled to a closed cell skin on an opposite surface, in accordance with certain embodiments.

In certain configurations, the composite articles described herein may comprise one or more closed cell skins. Referring to FIG. 5, a composite article 500 comprises a prepreg or core layer 510 coupled to an open cell skin 520 on a first surface 512 and coupled to a closed cell skin 530 at a second surface 514. Without wishing to be bound by any particular theory, sound waves can enter into the article 500 through the open cell skin 520 and into the core layer 510. The closed cell skin 530 can act to reflect sound waves back into the core layer 510 and the skin 520 to absorb the sound waves. Sound waves incident on the closed cell skin 530 may generally be reflected so that those sound waves do not pass through the article 500. By configuring the article 500 with both an open cell skin 520 and a closed cell skin 530, sound waves can absorbed through one surface and reflected by another surface to provide for increased noise reduction coefficients using the article 500. The open cell skin 520 may be any of those films described above in connection with the film layer 120.

The closed cell skin 530 generally comprises a lower open surface area than the open cell skin 520 and may comprise a heavier areal weight (for a comparable thickness) compared to an areal weight of the open cell skin 520. In some examples, even though the skin 530 is a closed cell skin, the skin 530 may permit transmission of water vapor through the article 500 to reduce the likelihood of mold growth and/or to permit transfer of water from one side of the article 500 to the other side of the article 500. The exact open surface area of the closed cell skin 530 may vary, for example, from about 0% to less than 10%, e.g., 1-9% or 2-8% or 3-7% or 4-6% or less than 5% open area. When an open cell skin and a closed cell skin are used together, the open surface area of the closed cell skin may be at least 50% less than an open surface area of the open cell skin or at least 75%, 80%, 85% or 90% less than an open surface area of the open cell skin. In some examples, the closed cell skin may be configured as a closed cell film, a closed cell scrim, a closed cell frim or other closed cell layers and materials.

While the exact materials and configurations used for the closed cell skin 530 may vary, illustrative materials include but are not limited to polyethylene skins such as a closed cell polyethylene film, polypropylene skins such as a closed cell polypropylene film or polyamide skins such as a closed cell polyamide film or combinations thereof. In some examples, the closed cell skin 530 may be similar to the open cell skin 520, e.g., may comprise the same materials such as polyolefin materials and polyamide materials, but the open cell skin 520 may comprise perforations or holes to increase the overall porosity or permeability of the skin 520 to permit sound waves to enter into the underlying core layer 500 through the skin 520. For example, the same film material can be used on both surfaces of a core layer, but the film on one surface of the core layer may be processed to provide perforations or openings prior to (or after) disposing the film on a surface of the core layer. The prepreg or core layer 510 may comprise any of those components described in reference to the prepreg or core layer 110 and generally is configured as a "heavy" prepreg or core layer with an areal weight of at least 2000 gsm or at least 2100 gsm or at least 2200 gsm or at least 2300 gsm or at least 2400 gsm or at least 2500 gsm. For example, the prepreg or core layer 510 may comprise one or more thermoplastic materials, a flame retardant material and reinforcing fibers randomly arranged in the prepreg or core layer 510.

Figure 6:
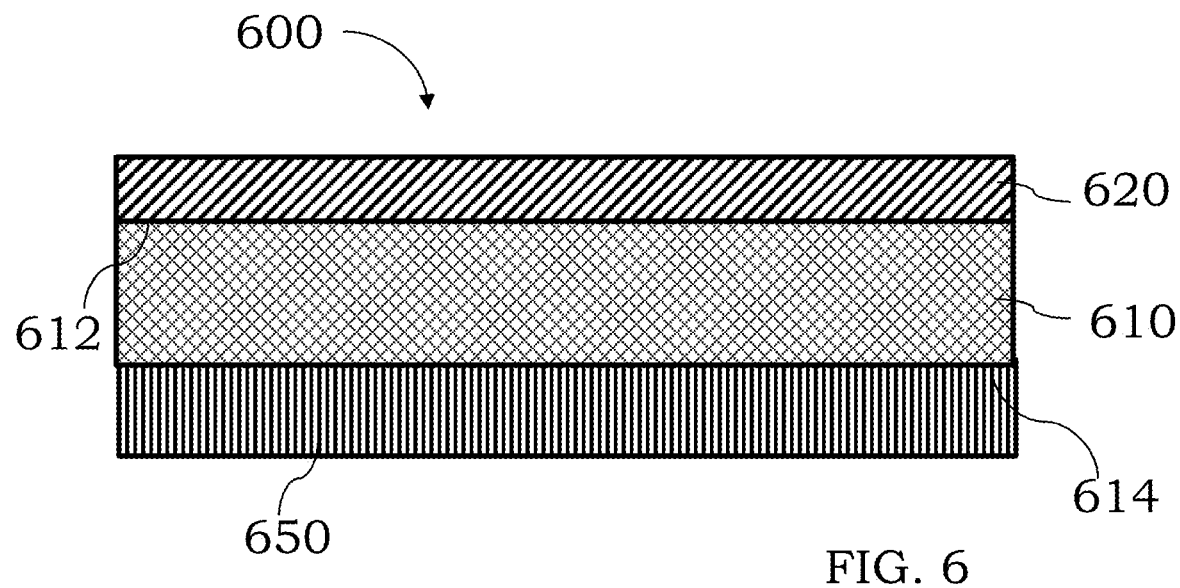
FIG. 6 is an illustration of a composite article comprising a prepreg or core layer coupled to an open cell skin on one surface and a surface layer coupled to the prepreg or core layer on an opposite surface, in accordance with some configurations.

In certain examples, the composite articles described herein may comprise one or more surface layers on an opposite surface of a core layer than where an open cell film is present. Referring to FIG. 6, a composite article 600 comprises a prepreg or core layer 610 coupled to an open cell skin 620 on a first surface 612 and coupled to a surface layer 650 at a second surface 614. The surface layer 650 may be any of those surface layers or skins described in reference to surface layer 440 above. If desired, the surface layer may also comprise a closed cell skin disposed on one or more surfaces. The open cell skin 620 may be any of those skins described above in connection with the skin layer 120, e.g., an open cell film, an open cell scrim, an open cell frim, etc. The prepreg or core layer 610 may comprise any of those components described in reference to the prepreg or core layer 110 and generally is configured as a "heavy" prepreg or core layer with an areal weight of at least 2000 gsm or at least 2100 gsm or at least 2200 gsm or at least 2300 gsm or at least 2400 gsm or at least 2500 gsm. For example, the prepreg or core layer 610 may comprise one or more thermoplastic materials, a flame retardant material and reinforcing fibers randomly arranged in the prepreg or core layer 610.

Figure 7:
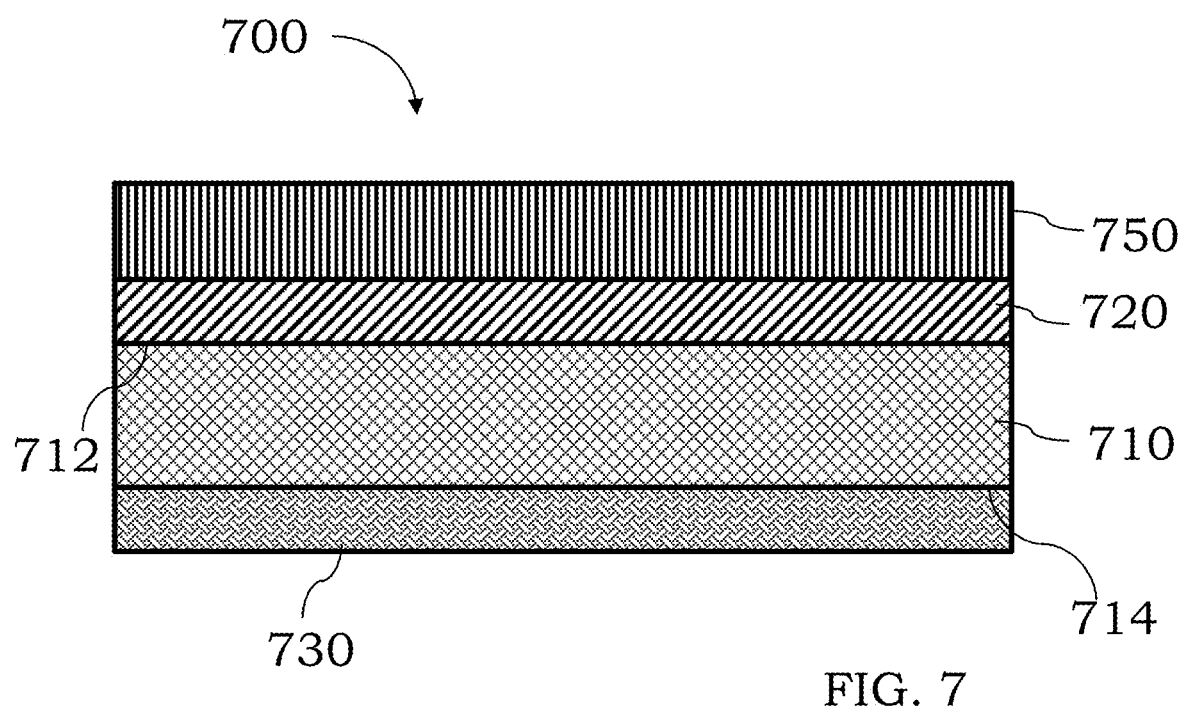
FIG. 7 is an illustration of a composite article comprising a prepreg or core layer coupled to an open cell skin on one surface, coupled to a closed cell skin on an opposite surface and where the open cell skin is coupled to a surface layer, in accordance with certain embodiments.
Figure 8:
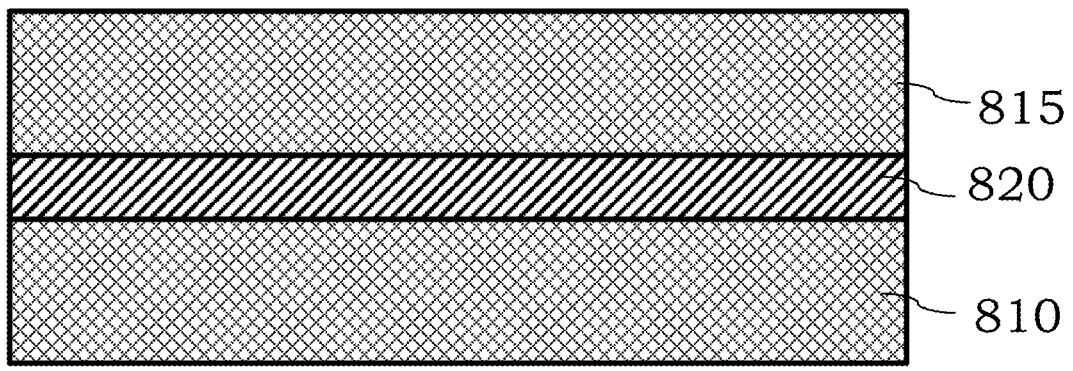
FIG. 8 is an illustration of a composite article comprising a first prepreg or core layer coupled to a second prepreg or core layer through an open cell skin, in accordance with certain examples.
Figure 9:
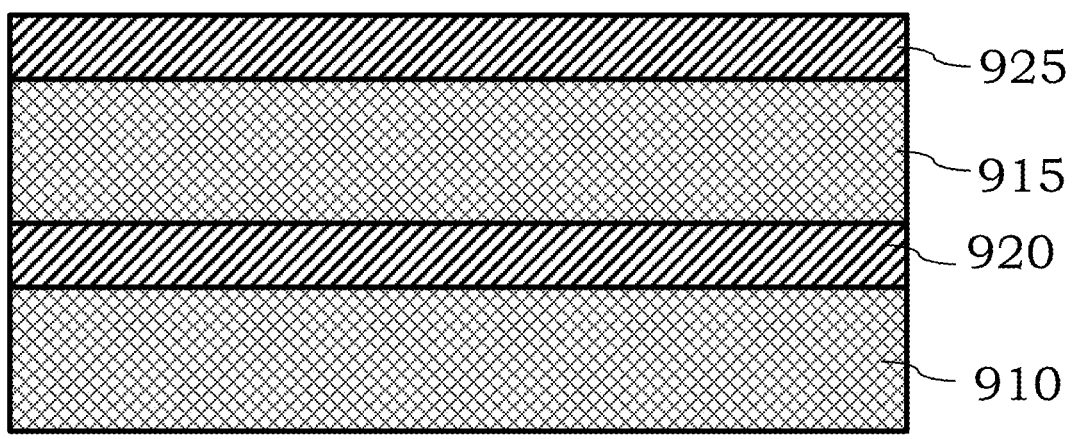
FIG. 9 is an illustration of a composite article comprising a first prepreg or core layer coupled to a second prepreg or core layer through an open cell skin and comprising another open cell skin coupled to one of the prepreg or core layers, in accordance with certain examples.
Figure 10:
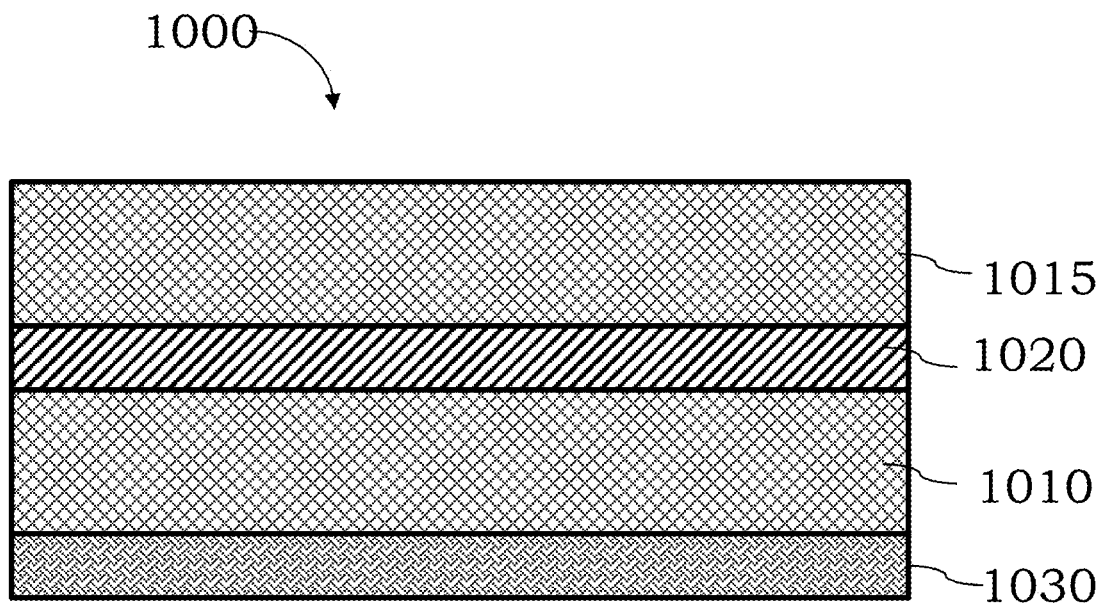
FIG. 10 is an illustration of a composite article comprising a first prepreg or core layer coupled to a second prepreg or core layer through an open cell skin and comprises a closed cell skin coupled to one of the prepreg or core layers, in accordance with certain embodiments.

In certain embodiments and referring to FIG. 7, an article 700 may comprise a prepreg or core layer 710, an open cell skin 720 disposed on a first surface 712 of the layer 710, a closed cell skin 730 disposed on another surface 714 of layer 710 and a surface layer 750 disposed on the open cell skin 720. The open cell skin 720 may be any of those films described above in connection with the open cell skin 120, e.g., an open cell film, an open cell scrim, an open cell frim, etc. The closed cell skin 730 may be any of those closed cell films described above in connection with the closed cell film 530, e.g., a closed cell film, a closed cell scrim, a closed cell frim, etc. The prepreg or core layer 710 may comprise any of those components described in reference to the prepreg or core layer 110 and generally is configured as a "heavy" prepreg or core layer with an areal weight of at least 2500 gsm. For example, the prepreg or core layer 710 may comprise one or more thermoplastic materials, a flame retardant material and reinforcing fibers randomly arranged in the prepreg or core layer 710.

In certain configurations, an open cell skin may be coupled to more than a single prepreg or core layer. For example and referring to FIG. 8, a composite article 800 comprises a first core layer 810 and a second core layer 815 separated by an open cell skin 820. The prepreg or core layers 810, 815 may be the same or may be different. In some instances, the layers 810, 815 generally comprise the same materials but may comprise different areal weights. For example, the weight of the prepreg or core layer 810 may be greater than or less than the weight of the prepreg or core layer 815. The layers 810, 815 may independently comprise any of those components described in reference to the prepreg or core layer 110. For example, one or both of the layers 810, 815 can be configured as a "heavy" prepreg or core layer with an areal weight of at least 2000 gsm or at least 2100 gsm or at least 2200 gsm or at least 2300 gsm or at least 2400 gsm or at least 2500 gsm. In some instances, each of the prepreg or core layers 810, 615 may comprise one or more thermoplastic materials, a flame retardant material and reinforcing fibers randomly arranged in the prepreg or core layers 810, 815. The thermoplastic materials, reinforcing fibers and flame retardant agent need not be the same in the different prepreg or core layers 810, 815. If desired, the sum of the weights of the two layers 810, 815 may be at least 2500 gsm with each layer contributing some weigh to the total weight, but the layers 810, 815 need not weigh the same. The open cell skin 820 may be any of those open cell skins described in connection with the open cell skin 120, e.g., an open cell film, an open cell scrim, an open cell frim, etc. While not shown, one or more surface layers can be coupled to the core layer 810, the core layer 815 or both if desired.

In certain examples, an open cell skin may be coupled to more than a single prepreg or core layer that is coupled to another open cell film. For example and referring to FIG. 9, a composite article 900 comprises a first core layer 910 and a second core layer 915 separated by an open cell skin 920. The core layer 915 comprises a second open cell skin 925 disposed on a surface. In some instances, the layers 910, 915 generally comprise the same materials but may comprise different areal weights. For example, the weight of the prepreg or core layer 910 may be greater than or less than the weight of the prepreg or core layer 915. The layers 910, 915 may independently comprise any of those components described in reference to the prepreg or core layer 110. For example, one or both of the layers 910, 915 can be configured as a "heavy" prepreg or core layer with an areal weight of at least 2000 gsm or at least 2100 gsm or at least 2200 gsm or at least 2300 gsm or at least 2400 gsm or at least 2500 gsm. In some examples, the prepreg or core layers 910, 915 may comprise one or more thermoplastic materials, a flame retardant material and reinforcing fibers randomly arranged in each of the prepreg or core layers 910, 915. The thermoplastic materials, reinforcing fibers and flame retardant agent need not be the same in each of the layer 910, 915. If desired, the sum of the weights of the two layers 910, 915 may be at least 2500 gsm with each layer contributing some weigh to the total weight, but the layers 910, 915 need not weigh the same. Each of the open cell skins 920, 925 may independently be any of those open cell skins described in connection with the open cell skin 120, e.g., an open cell film, an open cell scrim, an open cell frim, etc. Each of the open cell skins 920, 925 may also be the same or may be different. In some examples, the open surface area of the skin 925 may be greater than an open surface area of the skin 920 to permit sound waves to penetrate into the article 900. Further, the thickness of the skins 920, 925 can be the same or can be different. In some instances, the skins 920, 925 may be produced from the same skin, but the skin 925 may have an increased number of perforations or holes compared to a number of perforations or holes present in the skin 920. While not shown, one or more surface layers can be coupled to the skin 925, the core layer 910 or both if desired.

In some configurations, an open cell skin may be coupled to more than a single prepreg or core layer that is coupled to another open cell film and a closed cell film. For example and referring to FIG. 10, a composite article 1000 comprises a first core layer 1010 and a second core layer 1015 separated by an open cell skin 1020. A closed cell skin 1030 is coupled to an opposite surface of the core layer 1010. In some instances, the layers 1010, 1015 generally comprise the same materials but may comprise different areal weights. For example, the weight of the prepreg or core layer 1010 may be greater than or less than the weight of the prepreg or core layer 1015. The layers 1010, 1015 may independently comprise any of those components described in reference to the prepreg or core layer 110. For example, one or both of the layers 1010, 1015 can be configured as a "heavy" prepreg or core layer with an areal weight of at least 2000 gsm or at least 2100 gsm or at least 2200 gsm or at least 2300 gsm or at least 2400 gsm or at least 2500 gsm. In some instances, the prepreg or core layer 1010 may comprise one or more thermoplastic materials, a flame retardant material and reinforcing fibers randomly arranged in the prepreg or core layer 1010. The thermoplastic materials, reinforcing fibers and flame retardant agent in the layers 1010, 1015 need not be the same. If desired, the sum of the weights of the two layers 1010, 1015 may be at least 2500 gsm with each layer contributing some weigh to the total weight, but the layers 1010, 1015 need not weigh the same. The open cell skin 1020 may be any of those open cell skins described in connection with the open cell skin 120, e.g., an open cell film, an open cell scrim, an open cell frim, etc. The closed cell skin 1030 may be any of those closed cell skins described in connection with the closed cell film 530, e.g., a closed cell film, a closed cell scrim, a closed cell frim, etc. While not shown, one or more surface layers can be coupled to the core layer 1015, the closed cell skin 1030 or both if desired.

Additional layers such as decorative layers, textured layers, colored layers and the like may also be present in the composite articles described herein. For example, a decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, meltblown, wet-laid, and/or dry-laid processes. Insulation layers may also be bonded to one or more surfaces of the articles described herein, and the insulation layers may be open or closed, e.g., an open cell foam or a closed cell foam, as desired.

Figure 11:
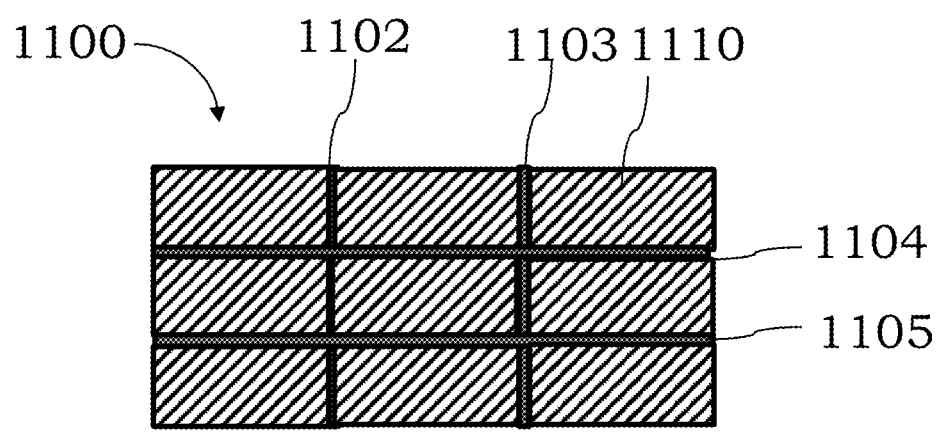
FIG. 11 is an illustration showing ceiling tiles where one of the ceiling tiles comprises a LWRT article as described herein, in accordance with certain examples.

In certain embodiments, any one or more of the articles described herein, e.g., those described in reference to FIGS. 1-10, can be configured as a ceiling tile to absorb sound and to provide flame retardancy. Referring to FIG. 11, a grid of ceiling tiles 1100 is shown that comprises support structures 1102, 1103, 1104 and 1105 with a plurality of ceiling tiles, such as tile 1110, laid into the grid formed by the support structures. As noted herein, the open cell skin of the ceiling tile is typically oriented toward a noise source to permit noise absorption. In some cases, the open cell skin of the ceiling tile faces toward an interior of a room, e.g., when noises from the room are desired to be reduced, whereas in other instances the open cell skin of the ceiling tile faces away from an interior of a room, e.g., when noises from ceiling mounted and suspended HVAC devices are desired to be reduced.

In some examples, the ceiling tile comprises a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin disposed on a first surface of the porous core layer, wherein the ceiling tile comprises a noise reduction coefficient of at least 0.5 as tested by ASTM C423-17, and wherein the ceiling tile comprises a flame spread index of less than 25 and a smoke development index of less than 150 as tested by ASTM E84 dated 2009. For example, the open cell skin comprises an open surface area of at least 10%. If desired, the ceiling tile comprises a noise reduction coefficient of at least 0.85 as tested by ASTM C423-17. In some examples, the ceiling tile may comprise a porous decorative layer disposed on the open cell skin, e.g., a fabric, cloth, or other layers. In certain instances, the flame retardant agent in the ceiling tile comprises expandable graphite particles or magnesium hydroxide or both. In some examples, the open cell skin comprises a perforated film with an open surface area of at least 10%, and wherein the ceiling tile panel comprises a noise reduction coefficient of at least 0.85 as tested by ASTM C423-17.

In certain instances, the ceiling tile may also comprise a closed cell skin disposed on a second surface of the porous core layer. In further examples, the flame retardant agent can be homogeneously dispersed in the porous core layer. In some examples, the thermoplastic material comprises a polyolefin resin. In certain embodiments, the plurality of reinforcing fibers comprise glass fibers or mineral fibers or both. In some instances, the porous core layer of the ceiling tile further comprises a clay.

Figure 12:
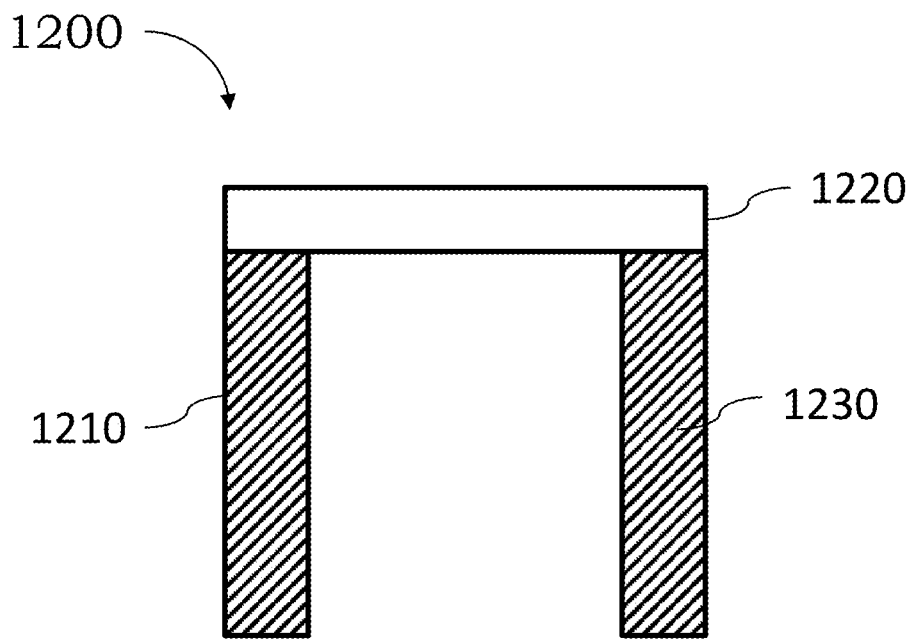
FIG. 12 is an illustration cubicle panels where one of the panels comprises a LWRT article as described herein, in accordance with certain examples.

In certain embodiments, any one or more of the articles described herein, e.g., those described in reference to FIGS. 1-10, can be configured as a cubicle panel to absorb sound and to provide flame retardancy. Referring to FIG. 12, a top view of a cubicle 1200 comprising side panels 1210, 1230 and center panel 1230 are shown. Any one or more of the panels 1210-1230 may comprise one of the LWRT articles described herein. As noted herein, the open cell skin of the cubicle panel is typically oriented toward a noise source to permit noise absorption. In some cases, the open cell skin of the cubicle panel faces toward an interior of the cubicle space, e.g., when noises from within the cubicle are desired to be reduced, whereas in other instances the open cell skin of the cubicle panel faces away from an interior of the cubicle space, e.g., when noises from outside the cubicle are to be reduced. If desired, two or more cubicle panels can be sandwiched with one open cell skin facing into the interior of the cubicle space and the open cell skin of the other cubicle panel facing outward away from the interior cubicle space.

In some examples, the cubicle wall panel is sized and arranged to couple to another cubicle wall panel and comprises a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin disposed on a first surface of the porous core layer, wherein the cubicle wall panel comprises a noise reduction coefficient of at least 0.5 as tested by ASTM C423-17, and wherein the cubicle wall panel comprises a flame spread index of less than 25 and a smoke development index of less than 150 as tested by ASTM E84 dated 2009. In some instances, the open cell skin comprises an open surface area of at least 10%. The cubicle wall panel may comprise a noise reduction coefficient of at least 0.85 as tested by ASTM C423-17. In other instances, the cubicle wall panel comprises a porous decorative layer disposed on the open cell skin. In further examples, the flame retardant agent in the cubicle wall panel comprises expandable graphite particles or magnesium hydroxide or both. In some configurations, the open cell skin comprises a perforated film with an open surface area of at least 10%, and wherein the cubicle wall panel comprises a noise reduction coefficient of at least 0.85 as tested by ASTM C423-17. In other instances, the cubicle wall panel comprises a closed cell skin disposed on a second surface of the porous core layer. In some examples, the flame retardant agent is homogeneously dispersed in the porous core layer. In other examples, the thermoplastic material comprises a polyolefin resin. In certain embodiments, the plurality of reinforcing fibers comprise glass fibers or mineral fibers or both. In some instances, In some examples, the porous core layer of the cubicle wall panel further comprises a clay.

Figure 13A:
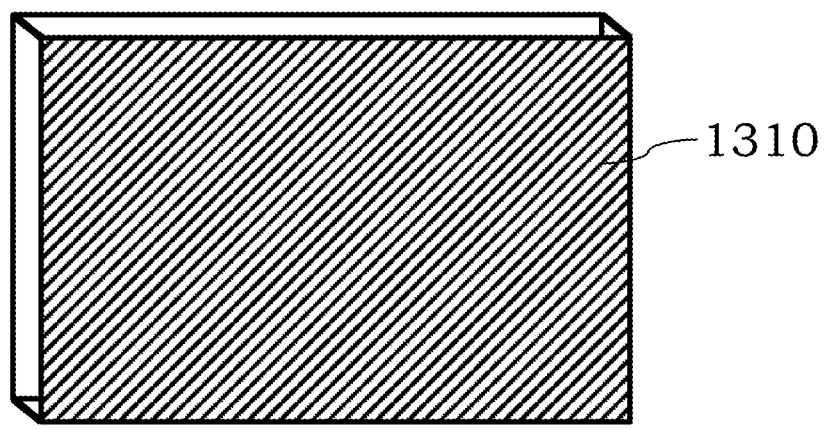
FIG. 13A is an illustration of a structural panel comprising a LWRT article as described herein.
Figure 13B:
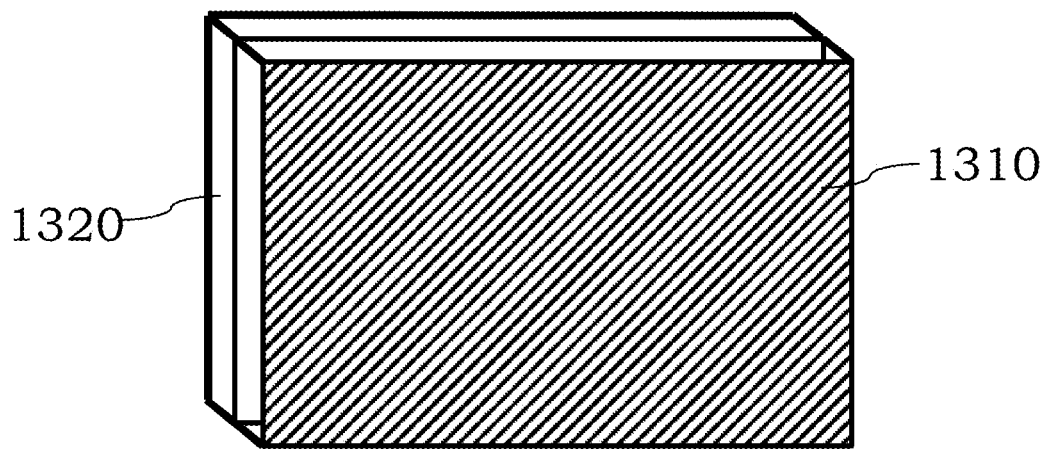
FIG. 13B is an illustration of a structural panel comprising a LWRT article coupled to a structural substrate, in accordance with certain embodiments.

In certain embodiments, any one or more of the articles described herein, e.g., those described in reference to FIGS. 1-10, can be configured as a structural panel to absorb sound and to provide flame retardancy. The structural panel can be used, for example, as sub-flooring, wall sheathing, roof sheathing, as structural support for cabinets, countertops and the like, as stair treads, as a replacement for plywood and other applications. If desired, the structural panel can be coupled to another substrate such as, for example, plywood, oriented strand board or other building panels commonly used in residential and commercial settings. Referring to FIG. 13A, a top view of a structural panel 1310 is shown. The panel 1310 may comprise any one of the LWRT articles described herein. As noted herein, the open cell skin of the structural panel is typically oriented toward a noise source to permit noise absorption. In some cases, the open cell skin of the structural panel faces toward an interior of a room, e.g., when noises from within the room are to be reduced, whereas in other instances the open cell skin of the structural panel faces away from an interior of a room, e.g., when noises from outside the room are to be reduced. If desired, two or more structural panels can be sandwiched with one open cell skin facing into the interior of the room and the open cell skin of the other structural panel facing outward away from the interior of the room.

In some instances, the structural panel may also comprise a structural substrate 1320. For example, a structural panel may comprise a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, an open cell skin coupled to a first surface of the porous core layer, and a structural substrate 1320 coupled to a second surface of the porous core layer, wherein the structural panel comprises a flame spread index of less than 25 and a smoke development index of less than 150 as tested by ASTM E84 dated 2009, and wherein the structural panel provides a noise reduction coefficient of at least 0.85 as tested by ASTM C423-17. The exact nature of the structural substrate 1320 may vary and includes, but is not limited to, plywood, gypsum board, wood planks, wood tiles, cement board, oriented strand board, polymeric or vinyl or plastic panels and the like. In some examples, the structural substrate comprises a plywood panel, a gypsum board, a wood tile, a ceramic tile, a metal tile, a wood panel, a concrete panel, a concrete board or a brick. In other examples, the open cell skin comprises an open surface area of at least 10%. If desired, the structural panel may comprise a noise reduction coefficient of at least 0.85 as tested by ASTM C423-17. In some instances, the structural panel may comprise a porous decorative layer disposed on the open cell skin. In other examples, the flame retardant agent comprises expandable graphite particles or magnesium hydroxide or both. In some examples, the open cell skin comprises a perforated film with an open surface area of at least 10%, and wherein the structural panel comprises a noise reduction coefficient of at least 0.85 as tested by ASTM C423-17. In some examples, the structural panel comprises a closed cell skin disposed on a second surface of the porous core layer. In other examples, the flame retardant agent is homogeneously dispersed in the porous core layer. In some embodiments, the thermoplastic material comprises a polyolefin resin and the plurality of reinforcing fibers comprise glass fibers or mineral fibers or both. If desired, the structural panel may further comprise a second structural panel coupled to the open cell skin, wherein the second structural panel is a porous structural panel.

Figure 14:
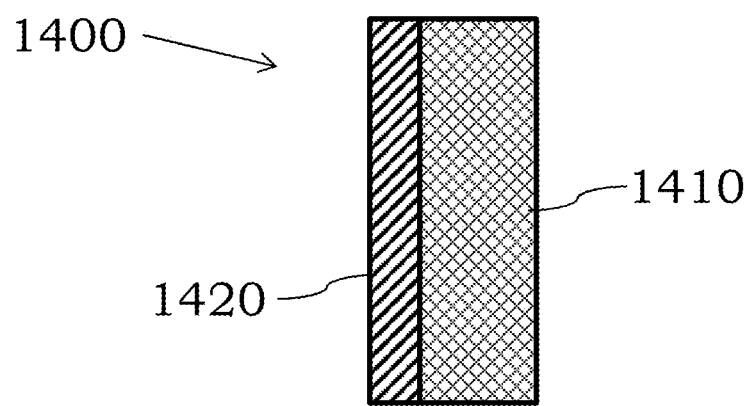
FIG. 14 is an illustration of wall board comprising a LWRT article as described herein, in accordance with certain examples.

In certain instances, any one or more of the articles described herein, e.g., those described in reference to FIGS. 1-10, can be configured as a wall board or wall panel to absorb sound and to provide flame retardancy. The wall panel can be used, for example, to cover studs or structural members in a building, to cover ceiling joists or trusses and the like. If desired, the wall panel can be coupled to another substrate such as, for example, tile, wood paneling, gypsum, concrete backer board, or other wall panel substrates commonly used in residential and commercial settings. Referring to FIG. 14, a side view of a wall panel 1400 is shown. The panel 1400 may comprise any one of the LWRT articles described herein. As noted herein, the open cell skin of the wall panel is typically oriented toward a noise source to permit noise absorption. In some cases, the open cell skin of the wall panel faces toward an interior of a room, e.g., when noises from within the room are to be reduced, whereas in other instances the open cell skin of the wall panel faces away from an interior of a room, e.g., when noises from outside the room are to be reduced. If desired, two or more wall panels can be sandwiched with one open cell skin facing into the interior of the room and the open cell skin of the other wall panel facing outward away from the interior of the room.

In some instances, the wall panel 1400 comprises a porous core layer 1410 comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm. The wall panel 1400 may also comprise an open cell skin 1420 coupled to a first surface of the porous core layer 1410. As noted herein, an optional wall substrate can be coupled to a second surface of the porous core layer 1410 and configured to support the porous core layer 1410 when the wall panel 1400 is coupled to a wall surface, wherein the wall panel comprises a flame spread index of less than 25 and a smoke development index of less than 150 as tested by ASTM E84 dated 2009, and wherein the wall panel 1400 comprises a sound absorption coefficient of at least 0.5 as tested by ASTM C423-17.

In some examples, the wall substrate is cellulose free. In other examples, the open cell skin 1420 comprises an open surface area of at least 10%, and wherein the wall panel 1400 comprises a noise reduction coefficient of at least 0.85 as tested by ASTM C423-17. In certain configurations, the wall panel 1400 further comprises a porous decorative layer disposed on the open cell skin 1420. In other examples, the flame retardant agent comprises expandable graphite particles or magnesium hydroxide or both.

In certain examples, the open cell skin 1420 comprises a perforated film with an open surface area of at least 10%, and wherein the wall panel comprises a noise reduction coefficient of at least 0.5 as tested by ASTM C423-17. In some embodiments, the wall panel may comprise a closed cell skin disposed on a second surface of the porous core layer. In other instances, the flame retardant agent is homogeneously dispersed in the porous core layer. In some examples, the thermoplastic material comprises a polyolefin resin and the plurality of reinforcing fibers comprise glass fibers or mineral fibers or both. In certain embodiments, a second wall panel can be coupled to the open cell skin 1420, wherein the second wall panel is a porous wall panel.

Figure 15:
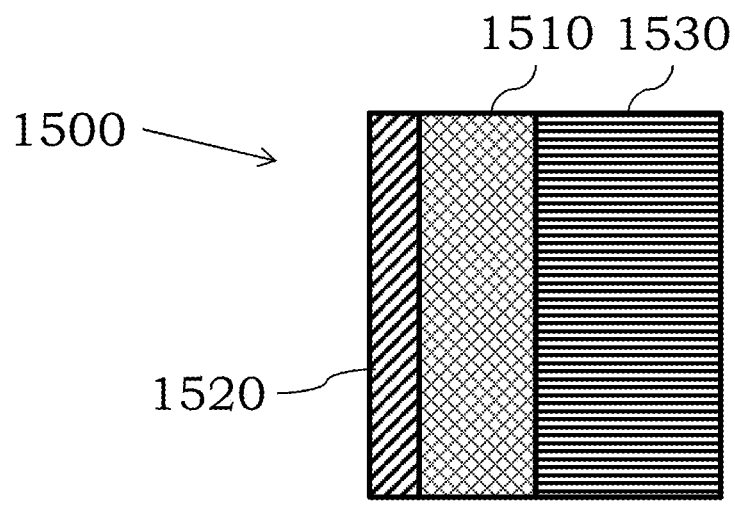
FIG. 15 is an illustration of building siding comprising a LWRT article as described herein, in accordance with certain embodiments.

In certain instances, any one or more of the articles described herein, e.g., those described in reference to FIGS. 1-10, can be configured as a siding to be attached to a building such as a residential home or a commercial building to absorb sound and to provide flame retardancy. The siding can be used, for example, to cover house wrap, sheathing or other materials commonly used on outer surfaces of a building. If desired, the siding can be coupled to another substrate such as, for example, vinyl, concrete boards, wood siding, bricks or other substrates commonly placed on the outside of buildings. Referring to FIG. 15, a side view of a siding panel 1500 is shown. The panel 1500 may comprise any one of the LWRT articles described herein. As noted herein, the open cell skin of the siding is typically oriented toward a noise source to permit noise absorption. In some cases, the open cell skin of the siding faces toward an interior of a building, e.g., when noises from within the building are to be reduced, whereas in other instances the open cell skin of the siding faces away from an interior of the building, e.g., when noises from outside the building are to be reduced. If desired, two or more siding panels can be sandwiched with one open cell skin facing into the interior of the building and the open cell skin of the other wall panel facing outward away from the interior of the building.

In some examples, the siding may be configured with a flame retardant and noise reducing layer can be coupled to a substrate 1530. For example, the flame retardant and noise reducing layer may comprise a porous core layer 1510 comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin 1520 coupled to a first surface of the porous core layer, wherein the flame retardant layer comprises a flame spread index of less than 25 and a smoke development index of less than 150 as tested by ASTM E84 dated 2009, and wherein the flame retardant layer comprises a noise reduction coefficient of at least 0.5 as tested by ASTM C423-17. The substrate 1530 can be configured with many different materials including, but not limited to vinyl, wood, brick, concrete, etc. For example, a vinyl substrate can be coupled to a first surface of the flame retardant and noise reducing layer, and the siding can be configured to couple to a non-horizontal surface of a building to retain the siding panel to the non-horizontal surface of the building.

In some instances, the siding panel further comprises a weather barrier, e.g., house wrap, a membrane, etc. coupled to a second surface of the flame retardant and noise reducing layer. In some embodiments, the substrate comprises a nailing flange to permit coupling of the siding to the side of the building.

In certain examples, the open cell skin of the siding panel comprises an open surface area of at least 10%, and wherein the siding comprises a noise reduction coefficient of at least 0.85 as tested by ASTM C423-17. In other examples, the flame retardant agent comprises expandable graphite particles or magnesium hydroxide or both.

In some instances, the open cell skin of the siding panel comprises a perforated film with an open surface area of at least 10%, and wherein the siding panel comprises a noise reduction coefficient of at least 0.85 as tested by ASTM C423-17. In other examples, the siding panel further comprises a closed cell skin disposed on a second surface of the porous core layer. In some examples, the flame retardant agent is homogeneously dispersed in the porous core layer. In other examples, the thermoplastic material comprises a polyolefin resin and the plurality of reinforcing fibers comprise glass fibers or mineral fibers or both. In some examples, the siding panel may further comprise a second siding panel comprising a second flame retardant and noise reducing layer coupled to a second substrate, wherein the flame retardant and noise reducing layer is configured to lock into the second flame retardant and noise reducing layer when the substrate is coupled to the second vinyl substrate, e.g., a butt joint, overlapping joint, etc. may exist where the two siding panels can horizontally lock into each other.

Figure 16:
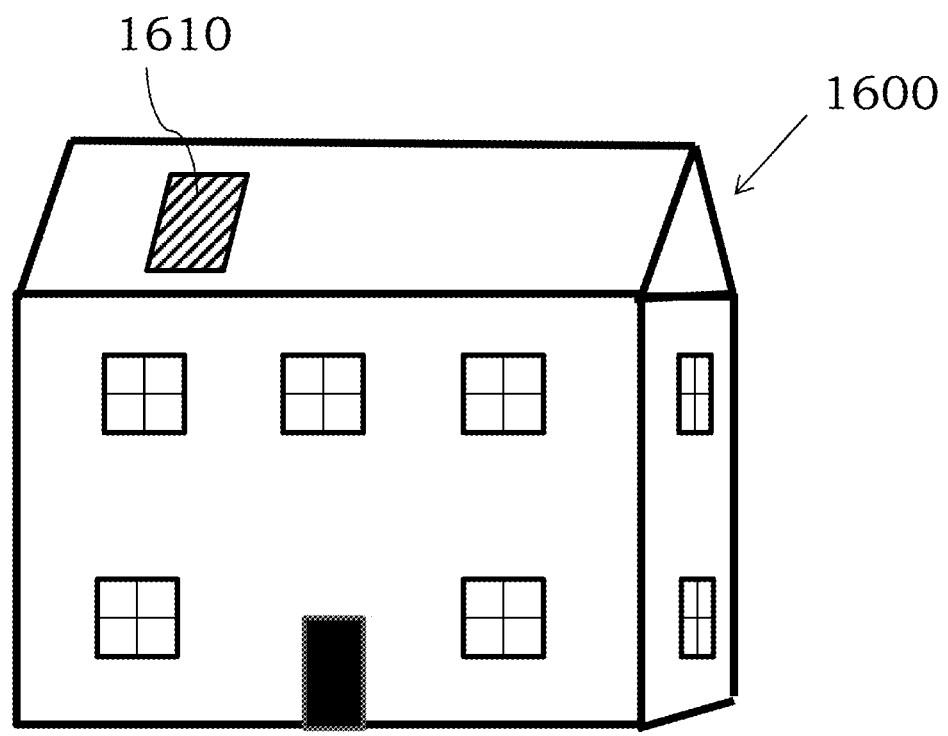
FIG. 16 is an illustration of a roofing panel comprising a LWRT article as described herein, in accordance with certain embodiments.
Figure 17:
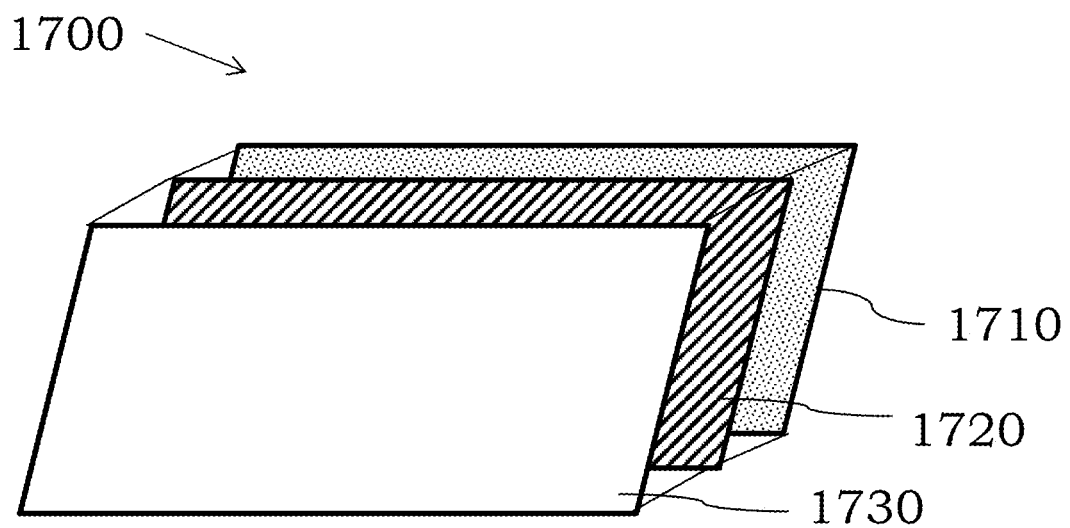
FIG. 17 is an illustration of a roofing shingle comprising a LWRT article as described herein, in accordance with certain embodiments.

In certain instances, any one or more of the articles described herein, e.g., those described in reference to FIGS. 1-10, can be configured as a roofing panel to be attached to a building such as a residential home or a commercial building to absorb sound and to provide flame retardancy. The roofing panel can be used, for example, to cover an attic space, attach to roof trusses or cover a flat roof as commonly present in commercial buildings. If desired, the roofing panel can be coupled to another substrate such as, for example, oriented strand board, plywood, or even solar cells that attach to a roof and function to cover the roof. Referring to FIG. 16, a perspective view of a roofing panel 1610 attached to a house 1600 is shown. The roofing panel 1610 may comprise any one of the LWRT articles described herein. As noted herein, the open cell skin of the roofing panel is typically oriented toward a noise source to permit noise absorption. In some cases, the open cell skin of the roofing panel faces toward an interior of an attic space, e.g., when noises from within the attic space are to be reduced, whereas in other instances the open cell skin of the roofing panel faces away from an interior of the attic space, e.g., when noises from outside the building are to be reduced. If desired, two or more roofing panel can be sandwiched with one open cell skin facing into the interior of the building and the open cell skin of the other roofing panel facing outward away from the interior of the building.

In some examples, the roofing panel comprises a flame retardant and noise reducing layer coupled to a roofing substrate. In certain examples, the flame retardant and noise reducing layer comprises a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin coupled to a first surface of the porous core layer, wherein the flame retardant and noise reducing layer comprises a flame spread index of less than 25 and a smoke development index of less than 150 as tested by ASTM E84 dated 2009, and wherein the flame retardant and noise reducing layer comprises a noise reduction coefficient of at least 0.5 as tested by ASTM C423-17. The roofing panel may also comprise a roofing substrate coupled to a first surface of the flame retardant and noise reducing layer and configured to couple to a roof of a building to retain the roofing panel to the roof.

In some examples, the roofing panel may comprise a weather barrier coupled to a second surface of the flame retardant and noise reducing layer, e.g., a membrane, house wrap, tar paper, plastic film, etc. In other instances, the roofing substrate comprises a cellulose-based material. In some examples, the open cell skin comprises an open surface area of at least 10%, and wherein the roofing panel comprises a noise reduction coefficient of at least 0.85 as tested by ASTM C423-17. In other examples, the flame retardant agent comprises expandable graphite particles or magnesium hydroxide or both. In some examples, the open cell skin comprises a perforated film with an open surface area of at least 10%, and wherein the roofing panel comprises a noise reduction coefficient of at least 0.85 as tested by ASTM C423-17. In other examples, the roofing panel comprises a closed cell skin disposed on a second surface of the porous core layer. In some instances, the flame retardant agent is homogeneously dispersed in the porous core layer. In other examples, the thermoplastic material comprises a polyolefin resin and the plurality of reinforcing fibers comprise glass fibers or mineral fibers or both. In certain instances, the roofing panel comprises a second roofing panel comprising a second flame retardant and noise reducing layer coupled to a second roofing substrate, wherein the flame retardant and noise reducing layer is configured to lock into the second flame retardant and noise reducing layer when the roofing substrate is positioned to overlap the second roofing substrate.

In certain configurations, any one or more of the articles described herein, e.g., those described in reference to FIGS. 1-10, can be configured as a roofing shingle to be attached to a building such as a residential home or a commercial building to absorb sound and to provide flame retardancy. The roofing shingle can be used, for example, to cover a roof commonly present in residential and commercial buildings. If desired, the roofing shingle can be coupled to another substrate such as, for example, asphalt, ceramic, clay tile, aluminum, copper, wood such as cedar and other materials commonly found or used as roofing shingles Referring to FIG. 17, an exploded view of a roofing shingle 1700 is shown. The roofing panel 1700 may comprise any one of the LWRT articles described herein. As noted herein, the open cell skin of the roofing shingle is typically oriented toward a noise source to permit noise absorption. In some cases, the open cell skin of the roofing shingle faces toward an interior of an attic space, e.g., when noises from within the attic space are to be reduced, whereas in other instances the open cell skin of the roofing shingle faces away from an interior of the attic space, e.g., when noises from outside the building are to be reduced. If desired, two or more roofing shingle can be sandwiched with one open cell skin facing into the interior of the building and the open cell skin of the other roofing panel facing outward away from the interior of the building.

In certain examples, the roofing panel 1700 comprises a flame retardant and noise reducing layer comprising a porous core layer 1710 comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin 1720 coupled to a first surface of the porous core layer, wherein the flame retardant and noise reducing layer comprises a flame spread index of less than 25 and a smoke development index of less than 150 as tested by ASTM E84 dated 2009, and wherein the flame retardant and noise reducing layer comprises a noise reduction coefficient of at least 0.5 as tested by ASTM C423-17. A weatherproof roofing shingle substrate 1730 can be coupled to a first surface of the flame retardant and noise reducing layer and configured to couple to a roofing panel of a building to provide a weatherproof, flame retardant and noise reducing roofing shingle over the roofing panel.

In certain instances, a weather barrier coupled to a second surface of the flame retardant and noise reducing layer. In other examples, the roofing shingle comprises asphalt. In some examples, the open cell skin comprises an open surface area of at least 10%, and wherein the roofing shingle comprises a noise reduction coefficient of at least 0.85 as tested by ASTM C423-17. In certain examples, the flame retardant agent comprises expandable graphite particles or magnesium hydroxide or both. In other examples, the open cell skin comprises a perforated film with an open surface area of at least 10%, and wherein the roofing shingle comprises a noise reduction coefficient of at least 0.85 as tested by ASTM C423-17. In some instances, the roofing shingle comprises a closed cell skin disposed on a second surface of the porous core layer. In other examples, the flame retardant agent is homogeneously dispersed in the porous core layer. In certain embodiments, the thermoplastic material comprises a polyolefin resin and the plurality of reinforcing fibers comprise glass fibers or mineral fibers or both. In some examples, the roofing shingle comprises a second roofing shingle comprising a second flame retardant and noise reducing layer coupled to a second weatherproof roof shingle, wherein the flame retardant and noise reducing layer is configured to lock into the second flame retardant and noise reducing layer when the weatherproof roofing shingle is positioned to overlap the second weatherproof roof shingle.

Figure 18:
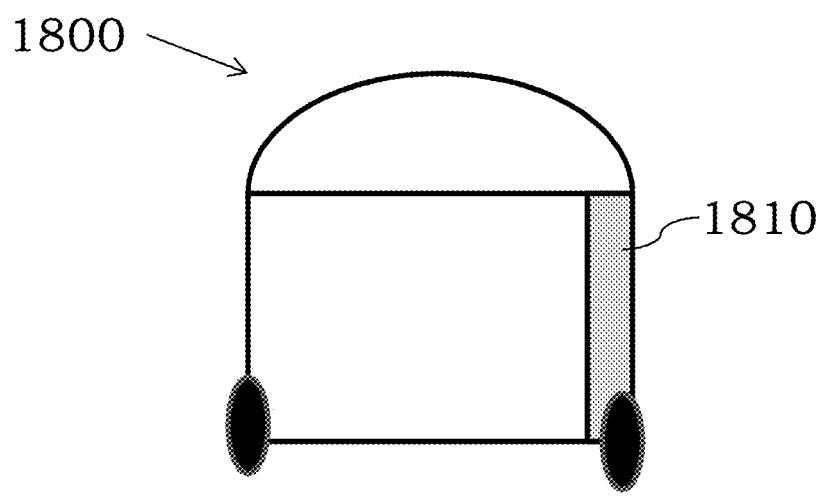
FIG. 18 is an illustration of an interior recreational vehicle wall comprising a LWRT article as described herein, in accordance with certain embodiments.

In certain configurations, any one or more of the articles described herein, e.g., those described in reference to FIGS. 1-10, can be configured as an interior panel or wall of a recreational vehicle (RV) to absorb sound and to provide flame retardancy. The panel or wall can be used, for example, to cover a skeleton structure on an interior side of the recreational vehicle and may be coupled to foam or other insulation materials between the interior and exterior of the recreational vehicle. If desired, the RV interior panel can be coupled to another substrate such as, for example, a fabric, plastic, tile, etc. Referring to FIG. 18, a side view of a recreational vehicle 1800 is shown. The interior panel 1800 may comprise any one of the LWRT articles described herein. As noted herein, the open cell skin of the interior panel is typically oriented toward a noise source to permit noise absorption. In some cases, the open cell skin of the interior panel faces toward an interior of the RV 1800, e.g., when noises from within the RV are to be reduced, whereas in other instances the open cell skin of the RV panel faces away from an interior of the RV 1800, e.g., when noises from outside the RV 1800 are to be reduced. If desired, two or more RV panels can be sandwiched with one open cell skin facing into the interior of the RV and the open cell skin of the other RV panel facing outward away from the interior of the RV.

In certain examples, a RV interior panel comprises a flame retardant and sound reducing layer comprising a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin coupled to a first surface of the porous core layer. In other instances, the RV interior panel comprises an interior wall substrate coupled to a second surface of the porous core layer, wherein the recreational vehicle interior panel comprises a flame spread index of less than 25 and a smoke development index of less than 150 as tested by ASTM E84 dated 2009, and wherein the recreational interior vehicle panel comprises a noise reduction coefficient of at least 0.5 as tested by ASTM C423-17. In some examples, the interior wall substrate is configured as a decorative layer such as a fabric, a plastic, tile, wood or the like. In some instances, the open cell skin comprises an open surface area of at least 10%, and wherein the recreational vehicle interior panel comprises a noise reduction coefficient of at least 0.85 as tested by ASTM C423-17. In other instances, the flame retardant agent comprises expandable graphite particles or magnesium hydroxide or both. In some examples, the open cell skin comprises a perforated film with an open surface area of at least 10%, and wherein the recreational vehicle interior panel comprises a noise reduction coefficient of at least 0.85 as tested by ASTM C423-17. In other examples, the RV interior panel comprises a closed cell skin disposed on a second surface of the porous core layer. In certain examples, the flame retardant agent is homogeneously dispersed in the porous core layer. In some embodiments, the thermoplastic material comprises a polyolefin resin and the plurality of reinforcing fibers comprise glass fibers or mineral fibers or both. In additional instances, the RV panel comprises a second RV interior panel comprising a second flame retardant and noise reducing layer coupled to a second interior wall substrate, wherein the flame retardant and noise reducing layer is configured to lock into the second flame retardant and noise reducing layer when the interior wall substrate is positioned to vertically overlap the second interior wall substrate at a first side of the RV interior panel. If desired, the RV panel may comprise a third RV interior panel comprising a third flame retardant and noise reducing layer coupled to a third interior wall substrate, wherein the flame retardant and noise reducing layer is configured to lock into the third flame retardant and noise reducing layer when the interior wall substrate is positioned to vertically overlap the third interior wall substrate at a second side of the recreational vehicle interior panel.

Figure 19:
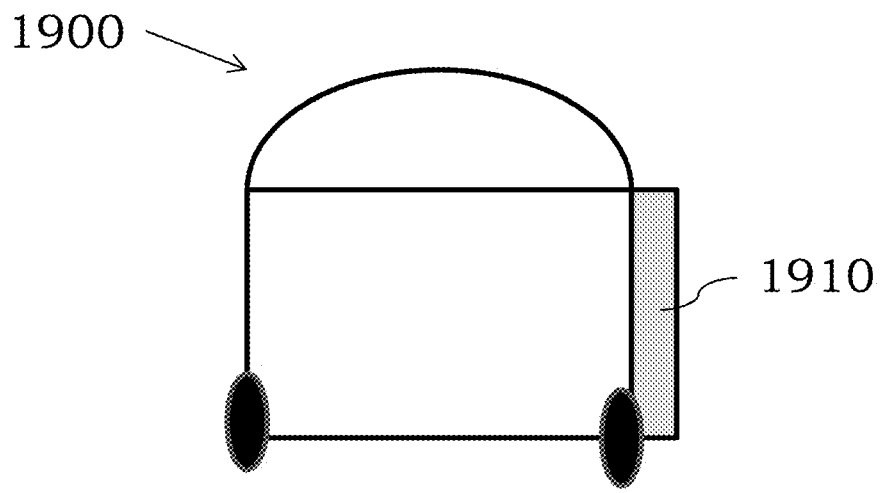
FIG. 19 is an illustration of an exterior recreational vehicle wall comprising a LWRT article as described herein, in accordance with certain embodiments.
Figure 20:
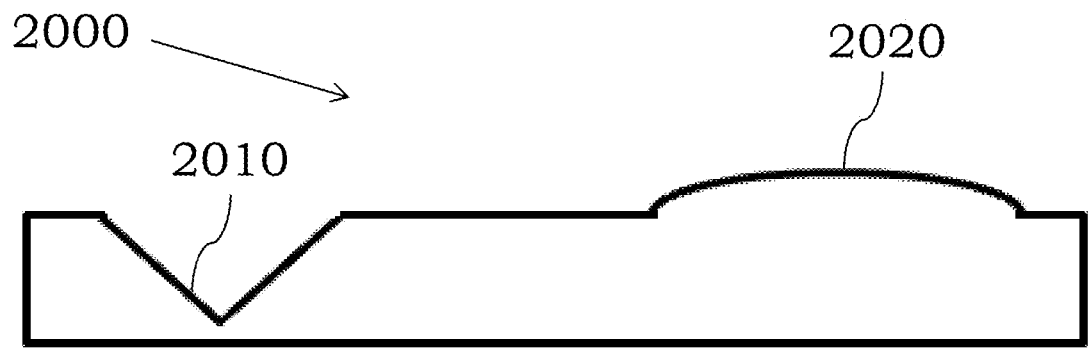
FIG. 20 is an illustration of an interior panel comprising a LWRT article comprising a two-dimensional feature, in accordance with certain examples.

In certain configurations, any one or more of the articles described herein, e.g., those described in reference to FIGS. 1-10, can be configured as an exterior panel or wall of a recreational vehicle (RV) to absorb sound and to provide flame retardancy. The panel or wall can be used, for example, to cover a skeleton structure on an exterior side of the recreational vehicle and may be coupled to foam or other insulation materials between the interior and exterior of the recreational vehicle. If desired, the RV exterior panel can be coupled to another substrate such as, for example, a metal, fiberglass, etc. Referring to FIG. 19, a side view of a recreational vehicle 1900 is shown that comprises an exterior panel 1910, which can be configured as any one of the LWRT articles described herein. As noted herein, the open cell skin of the exterior panel is typically oriented toward a noise source to permit noise absorption. In some cases, the open cell skin of the exterior panel faces toward an interior of the RV 1900, e.g., when noises from within the RV are to be reduced, whereas in other instances the open cell skin of the RV panel faces away from an interior of the RV 1900, e.g., when noises from outside the RV 1900 are to be reduced. If desired, two or more RV panels can be sandwiched with one open cell skin facing into the interior of the RV and the open cell skin of the other RV panel facing outward away from the interior of the RV.

In some examples, a RV exterior panel comprises a flame retardant and sound reducing layer comprising a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin coupled to a first surface of the porous core layer. The RV exterior panel may also comprise a weatherproof exterior wall substrate coupled to a second surface of the porous core layer, wherein the recreational vehicle exterior panel comprises a flame spread index of less than 25 and a smoke development index of less than 150 as tested by ASTM E84 dated 2009, and wherein the recreational exterior vehicle panel comprises a noise reduction coefficient of at least 0.5 as tested by ASTM C423-17.

In certain configurations, the exterior wall substrate comprises glass fibers or is configured as a metal panel. In some examples, the open cell skin comprises a perforated film with an open surface area of at least 10%, and wherein the recreational vehicle exterior panel comprises a noise reduction coefficient of at least 0.85 as tested by ASTM C423-17. In other examples, the flame retardant agent comprises expandable graphite particles or magnesium hydroxide or both. In certain examples, the open cell skin comprises a perforated film with an open surface area of at least 10%, and wherein the recreational vehicle exterior panel comprises a noise reduction coefficient of at least 0.85 as tested by ASTM C423-17. In some examples, the RV exterior panel comprises a closed cell skin disposed on a second surface of the porous core layer. In certain instances, the flame retardant agent is homogeneously dispersed in the porous core layer. In some examples, the thermoplastic material comprises a polyolefin resin and the plurality of reinforcing fibers comprise glass fibers or mineral fibers or both. In other examples, the RV panel comprises a second RV exterior panel comprising a flame retardant and noise reducing layer coupled to a second exterior wall substrate, wherein the flame retardant and noise reducing layer is configured to lock into the second flame retardant and noise reducing layer when the exterior wall substrate is positioned to overlap the second exterior wall substrate at a first side of the recreational vehicle exterior panel. In additional examples, the RV exterior panel comprises a third recreational vehicle exterior panel comprising a third flame retardant and noise reducing layer coupled to a third exterior wall substrate, wherein the flame retardant and noise reducing layer is configured to lock into the third flame retardant and noise reducing layer when the exterior wall substrate is positioned to overlap the third exterior wall substrate at a second side of the recreational vehicle exterior panel.

In certain configurations, any one or more of the articles described herein, e.g., those described in reference to FIGS. 1-10, can be configured as an interior panel to absorb sound and to provide flame retardancy. For example, an interior building panel comprising a two- or three-dimensional feature can be produced. The interior building panel comprises a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin disposed on a first surface of the porous core layer, wherein the interior building panel comprising the two- or three-dimensional feature comprises a noise reduction coefficient of at least 0.5 as tested by ASTM C423-17, and wherein the interior building panel comprising the two- or three-dimensional feature comprises a flame spread index of less than 25 and a smoke development index of less than 150 as tested by ASTM E84 dated 2009. As noted herein and referring to FIG. 20, an interior panel 2000 is shown that comprises a two-dimensional feature including a depression 2010 and raised surface 2020. The ability of the panels to provide complex shapes and surfaces is a substantial attribute. Such shapes and multi-dimensional features can be molded into a desired shape and used in interior applications including decorative wall panels.

Figure 21:
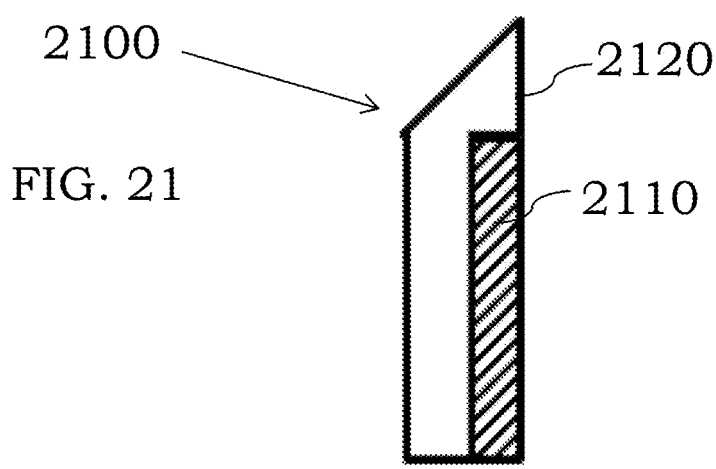
FIG. 21 is an illustration of interior trim comprising a LWRT article comprising a two-dimensional feature, in accordance with certain configurations.

In some examples, similar constructs can be used as interior trim applications. For example, an interior trim comprising a flame retardant and noise reducing layer and an interior trim substrate can be used. The flame retardant and noise reducing layer may comprise a porous core layer comprising a web of open celled structures comprising a random arrangement of a plurality of reinforcing fibers held together by a thermoplastic material, wherein the porous core layer comprises a flame retardant agent and an areal or basis weight of at least 2000 gsm or at least 2100 gsm or at least 2200 gsm or at least 2300 gsm or at least 2400 gsm or at least 2500 gsm, and an open cell skin disposed on a first surface of the porous core layer, wherein the flame retardant and noise reducing layer comprises a noise reduction coefficient of at least 0.5 as tested by ASTM C423-17, and wherein the flame retardant and noise reducing layer comprises a flame spread index of less than 25 and a smoke development index of less than 150 as tested by ASTM E84 dated 2009. The interior trim substrate can be coupled to a first surface of the flame retardant and noise reducing layer and may comprise woods, PVC, vinyl, plastic, leather or other materials. A side view illustration of a trim piece that can be used as baseboard trim is shown in FIG. 21. The trim piece 2100 comprises a trim substrate 2120 coupled to a flame retardant and noise reducing layer 2110. The trim piece 2100 may be nailed or otherwise attached to a stud or wallboard as desired. The substrate 2120 faces outward and is viewable within a room. The trim piece 2100 can be curved or may take two or three dimensional shapes as desired.

In certain examples, a prepreg or core of the articles described herein can be generally prepared using chopped glass fibers, a thermoplastic material, a flame retardant material and open cell films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the thermoplastic material. To produce the prepreg or core, a thermoplastic material, reinforcing materials, flame retardant material(s) and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the flame retardant materials. In some examples, the dispersed mixture of glass and resin can be pumped to a head-box located above a wire section of a paper machine via a distribution manifold. The foam, not the glass fiber, flame retardant material or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, an open cell film may be laminated onto the web by passing the web of glass fiber, flame retardant material, thermoplastic material and open cell film through the nip of a set of heated rollers. If desired, additional layers such as, for example, a closed cell film, a non-woven and/or woven fabric layer, a surface layer, etc. may also be attached along with the open cell film to one side or to both sides of the web to facilitate ease of handling the produced composite. The composite can then be passed through tension rolls and continuously cut (guillotined) into the desired size for later forming into an end product article. Further information concerning the preparation of such composites, including suitable materials and processing conditions used in forming such composites, are described, for example, in U.S. Pat. Nos. 6,923,494, 4,978,489, 4,944, 843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In certain instances, a method of producing a composite article comprises combining a thermoplastic material, reinforcing fibers and a flame retardant material in a mixture to form an agitated aqueous foam. The foam is disposed onto a wire support, and the water is evacuated to form a web or open cell structure comprising the thermoplastic material, fibers and flame retardant materials. In some instances, the web is then heated to a first temperature above the melting temperature of the thermoplastic material. In some instances, pressure can then be applied to the web, e.g., using nip rollers or other devices, to provide a thermoplastic composite sheet comprising the flame retardant material dispersed in the web. An open cell film may then be disposed on the formed prepreg or core optionally with heating to bond the open cell film to the prepreg or core.

In certain instances, a method of producing a composite article comprises combining a thermoplastic material, reinforcing fibers and a mixture of one or more of (1) EG materials and a (2) Group II or Group III metal hydroxide (such as MDH or ATH) in a mixture to form an agitated aqueous foam. The foam is disposed onto a wire support, and the water is evacuated to form a web or open cell structure comprising the thermoplastic material, fibers and EG materials/group II or group III metal hydroxide materials. In some instances, the web is then heated to a first temperature above the melting temperature of the thermoplastic material. If desired, the core may be compressed prior to fully forming. In some instances, pressure can then be applied to the web, e.g., using nip rollers or other devices, to provide a thermoplastic composite sheet comprising the flame retardant material from the EG materials/group II or group III metal hydroxide materials dispersed in the web. An open cell film may then be disposed on the formed prepreg or core optionally with heating to bond the open cell film to the prepreg or core.

In some embodiments, a composite article comprises a thermoplastic fiber-reinforced porous core layer and an open cell film disposed on at least one surface of the porous core layer, the porous core layer comprising a web formed from a plurality of reinforcing fibers, a flame retardant material and a thermoplastic material, the composite article comprising an effective amount of the flame retardant material to meet Class A requirements as tested by ASTM E84 dated 2009 and to provide a noise reduction coefficient (NRC) of at least 0.50 as tested by ASTM C423-17. More particularly, the NRC may be at least 0.50 as tested by ASTM C423-17.

The composite article can be used in various settings including, but not limited to, office furniture, seating, etc. In some instances, the thermoplastic material comprises a polyolefin, the reinforcing fibers comprise glass fibers and the flame retardant material comprises a group II metal hydroxide or an EG material or both. In other examples, the glass fibers are present from about 30 to 60 weight percent, the flame retardant material is present from about 30 weight percent to about 50 weight percent with the balance of the core layer comprising the thermoplastic material. The areal weight of the core is desirably at least 2000 gsm or at least 2100 gsm or at least 2200 gsm or at least 2300 gsm or at least 2400 gsm or at least 2500 gsm or more to enhance sound absorption. In some instances, an adhesive layer may be present between the core layer and the open cell film. In certain embodiments, the article may comprise a second skin layer disposed on an opposite surface of the core layer.

Certain specific examples are described to illustrate further some of the novel and useful aspects of the technology described herein.

Example 1

LWRT sheets were produced using a wet-lay method. The LWRT sheets were polyolefin based, e.g., polypropylene based, and were reinforced using chopped glass fibers. Polypropylene resin and glass fiber were mixed in water and agitated into a uniform suspension. The suspension was deposited on a forming wire and the water was removed to form a web comprising the polypropylene resin and the glass fibers. Further processing using heat melted the resin, and a solid composite core is formed after the web cools down to a temperature below the melting point of the resin under pressure.

Example 2

LWRT sheets were formed similar to those produced in Example 1 but a flame retardant agent was added to the mixture of resin and chopped glass fibers. Two different flame retardant materials were used including expandable graphite (EG) and magnesium hydroxide (MDH). Both grades meet the Class A requirements as tested by ASTM E84 method, and one grade meets SE-0 requirement as tested by SAE J369 method.

Example 3

Various materials were added to the core formed from Example 2 subsequent to formation of the web of Example 2 but prior to final core formation. Materials were applied to both sides of the web. Tables 1 and 2 list various materials and additive present in certain tested LWRT articles.

TABLE 1

| Material | FR Additive | Core Areal Density (gsm) | Surface Materials Added to the Core |
|---|---|---|---|
| Control A | None | 2800 | 92 gsm film/scrim laminate on one side; 20 gsm scrim on other side |
| Sample A1 | MDH | 2800 | 20 gsm scrim on each side |
| Sample A2 | MDH | 2800 | 88 gsm perforated film on one side; 20 gsm scrim on other side |
| Sample A3 | MDH | 2800 | 92 gsm scrim/film laminate on one side; 20 gsm scrim on other side |

TABLE 2

| Material | FR Additive | Core Areal Density (gsm) | Surface Materials Added to the Core |
|---|---|---|---|
| Control B | None | 1200 | 90 gsm scrim on one side; 20 gsm scrim on other side |
| Sample B1 | MDH | 1200 | 20 gsm scrim on each side |
| Sample B2 | EG | 1200 | 20 gsm scrim on each side |
| Sample B3 | EG | 1200 | 90 gsm scrim on one side; 20 gsm scrim on other side |

Loft is a property of LWRT cores that allows the thermoformability of LWRT materials. When an LWRT sheet is heated to a temperature above the melting point of the resin, the glass fibers in the LWRT sheet can spring back to a free standing status, which can result in a thickness increase of the composite sheet. The lofted LWRT can be further molded to a desired thickness of the end-use application. The LWRT materials were tested both with and without thermo-forming process. Taking a flat 1200 gsm panel as an example, the LWRT material could be heated in an oven set at 204° C. for 4 minutes, and then compressed by a cold press to the desired thickness.

Example 4

Physical properties, including areal density, ash content, as-produced thickness, and loft thickness, were measured using disks with a 99 mm diameter. Two test standards were followed to test the acoustic performances. ASTM E1050 was followed to evaluate both groups of materials, and the materials in Group A of Table 1 were also tested according to ASTM C423-17 method due to the potential usage for building and construction applications. SAE J369 and ASTM E84 methods were followed to conduct the flammability tests. SAE J369 is more popular in automotive applications, whereas the performance tested by ASTM E84 method gives more insight to the performance expected by office furniture and building and construction industries. In addition, flexural strengths of the materials were also tested following ASTM D790 or ISO 178 method.

Table 3 lists the measured physical properties of the various tested materials.

TABLE 3

| Material | Substrate Areal Density (gsm) | Ash Content (%) | Pre-Loft Thickness (mm) | Post-Loft Thickness (mm) |
|---|---|---|---|---|
| Control A | N/A | 57.5 | 13.1 | 14.5 |
| Sample A1 | MDH | 60.0 | 10.9 | 13.5 |
| Sample A2 | MDH | 58.4 | 11.4 | 14.3 |
| Sample A3 | MDH | 58.9 | 11.9 | 13.4 |
| Control B | N/A | 35.6 | 3.0 | 13.5 |
| Sample B1 | MDH | 60 | 3.4 | 6.4 |
| Sample B2 | EG | 44.8 | 3.5 | 7.2 |
| Sample B3 | EG | 43.2 | 3.6 | 7.3 |

Figure 22:
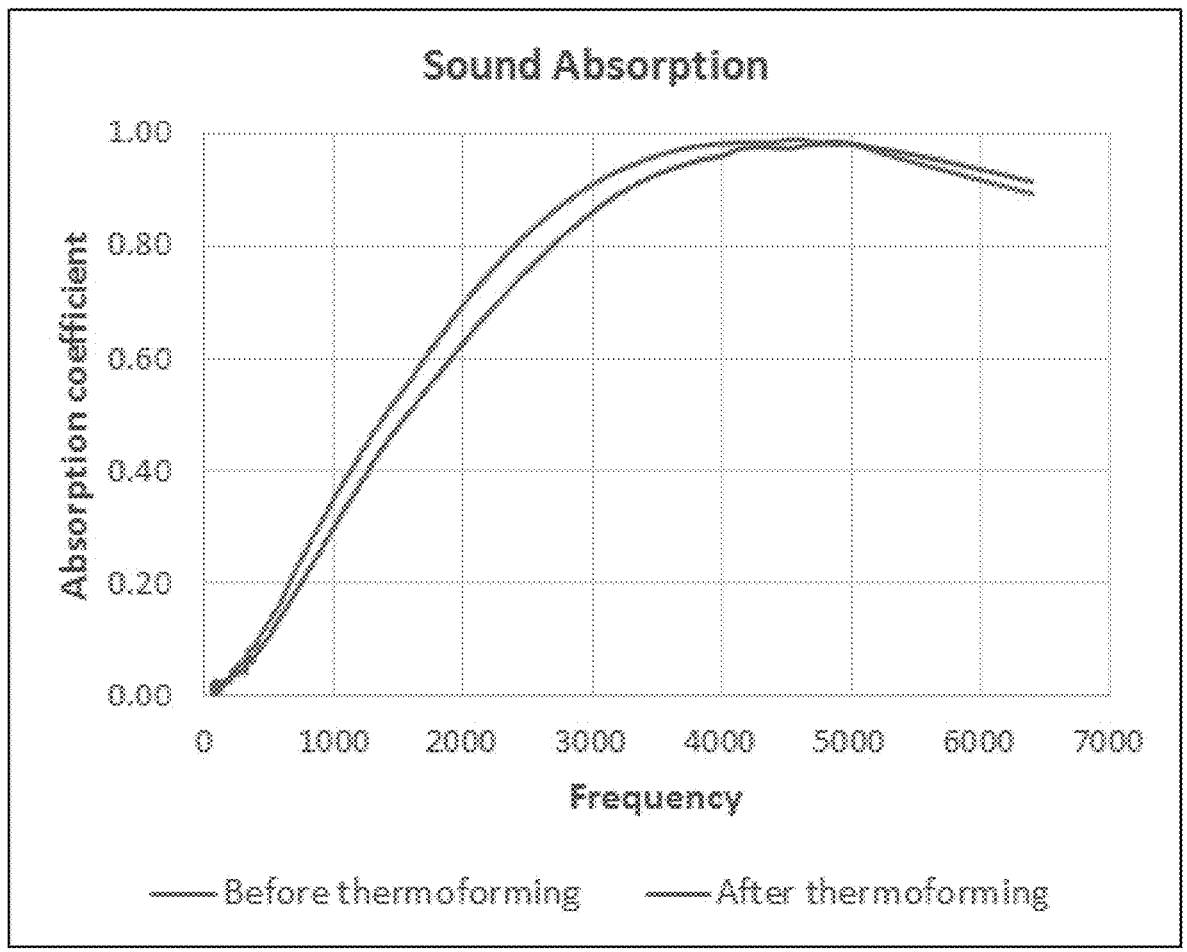
FIG. 22 is a graph showing sound absorption results for certain tested materials, in accordance with certain examples.
Figure 23:
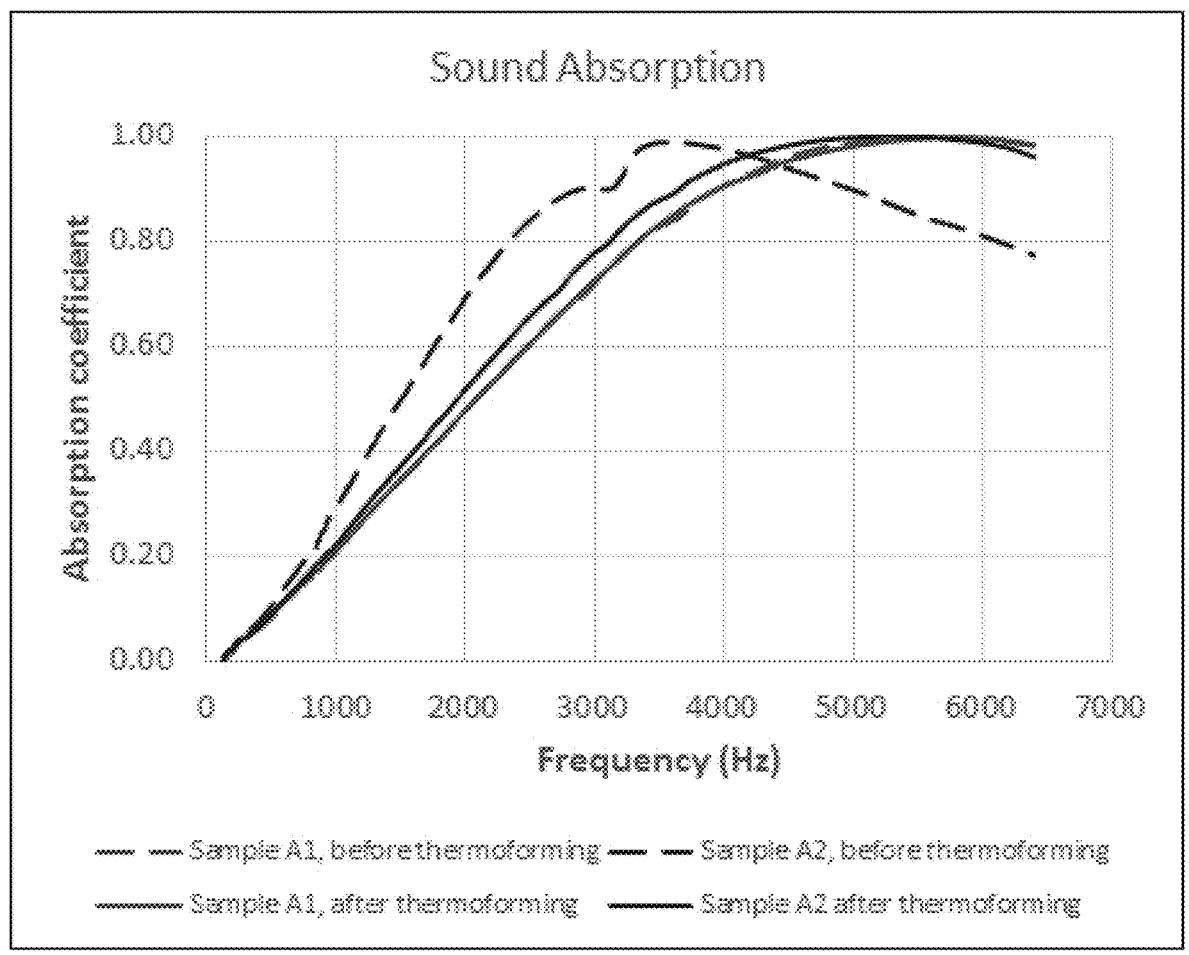
FIG. 23 is a graph showing acoustic properties measured on Sample A1 and Sample A2, in accordance with certain configurations.

Acoustic properties were measured for the Control A material using ASTM E1050. FIG. 22 is a graph showing the sound absorption results. Acoustics properties were also measured on Sample A1 and Sample A2. FIG. 23 is a graph showing those results. The materials were tested both with and without thermoforming process. The absorption coefficient does not show dependence on the thermoforming process for either standard LWRT formulation or MDH formulations, when there is no surface laminates or with just light weight scrim. The difference in Sample A2 before and after thermoforming process materials is consistent with a minor surface open area change during the thermoforming process. Generally, the sound absorption performance is more determined by the combination of material thickness, areal density and the open structure of surface materials.

Figure 24:
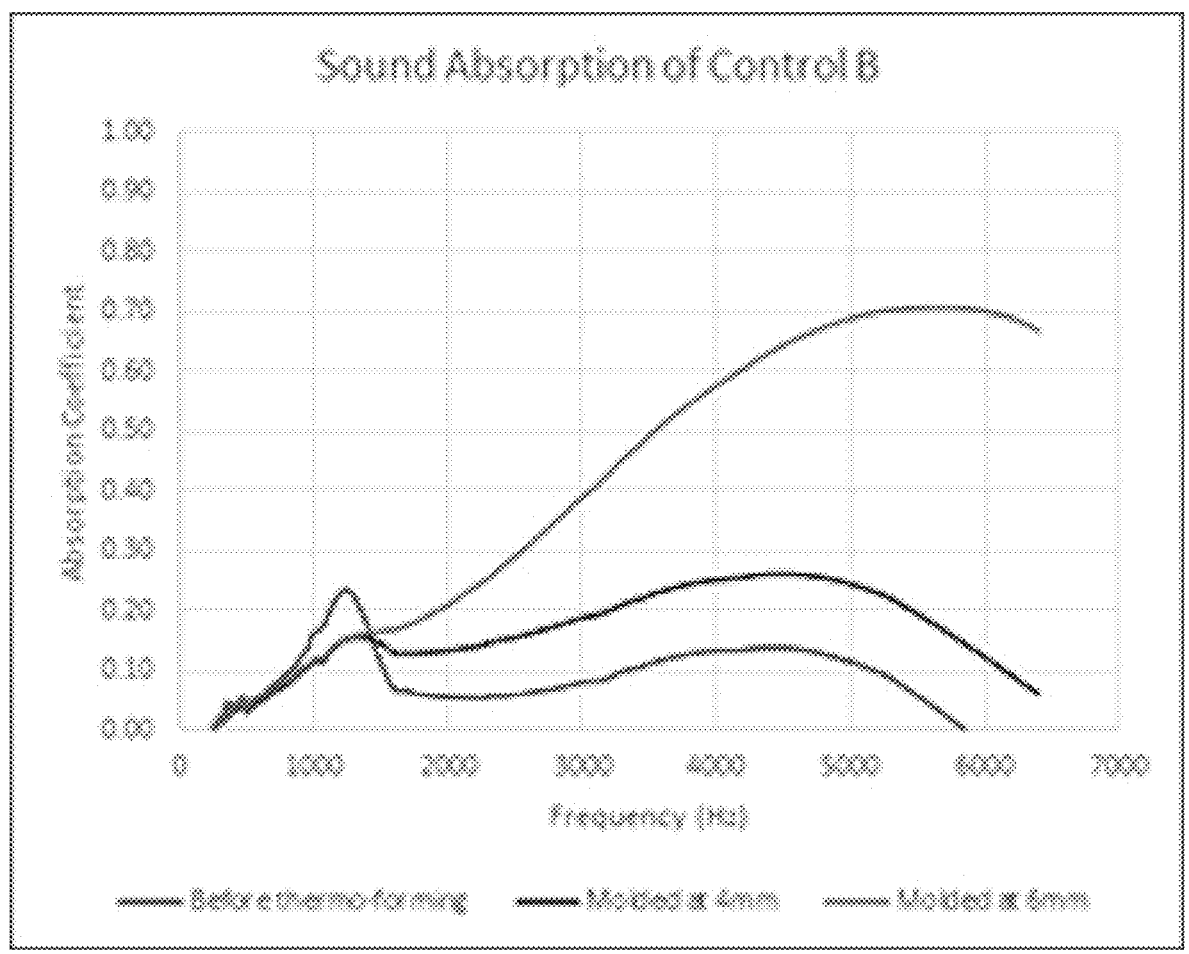
FIG. 24 is a graph showing sound absorption performance of Control B sample, in accordance with certain examples.
Figure 25:
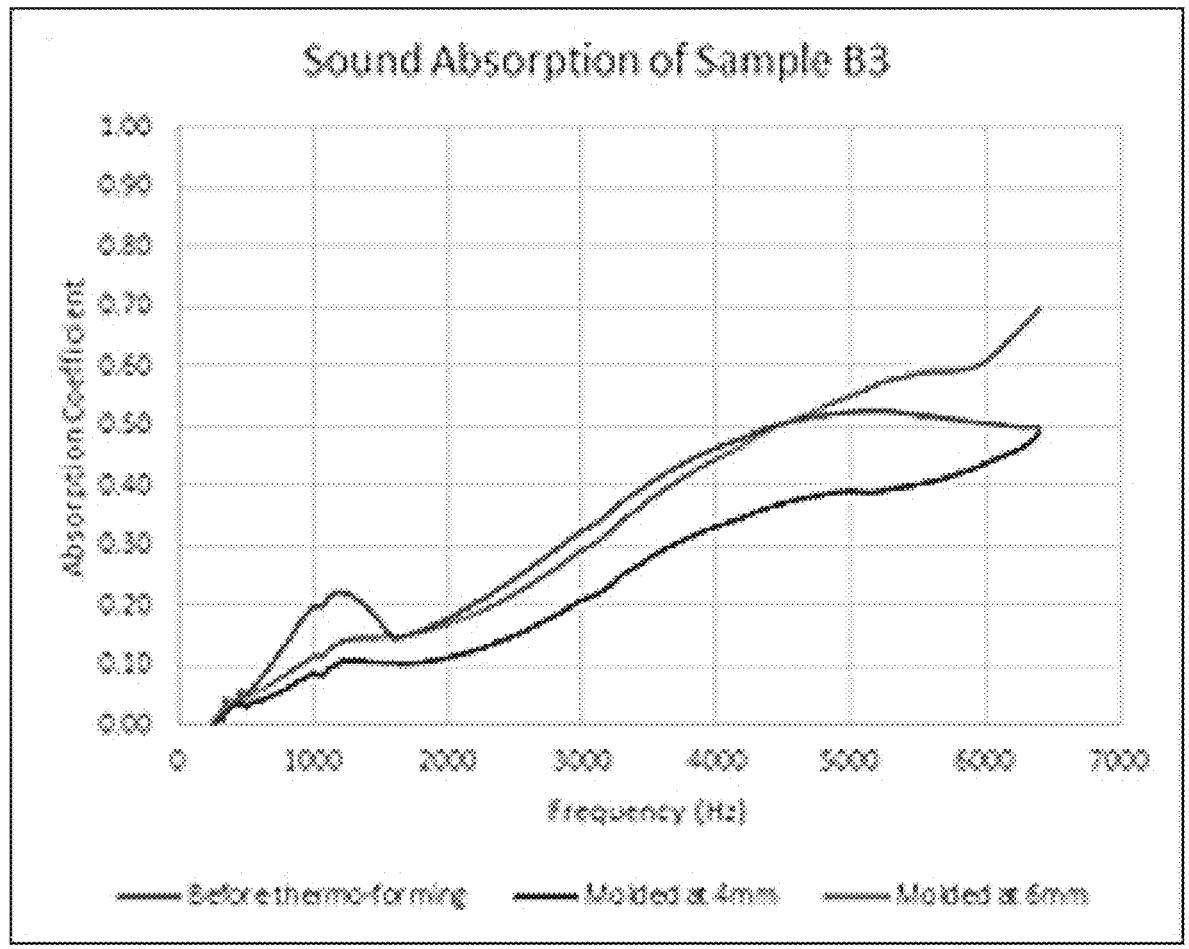
FIG. 25 is a graph showing sound absorption performance of Sample B3, in accordance with certain examples.

Control B and Sample B3 were also considered for use in automotive applications, where more complicated part geometries are generally required and the thermo-forming process would be necessary. Sound absorption performances of Control B and Sample B3 were tested without thermo-forming and with thermo-forming to 4 mm and 6 mm as shown in FIGS. 24 and 25. Unlike the standard LWRT and MDH version LWRT, the EG grade LWRT exhibits a different relationship between molding thickness and absorption coefficient. A higher absorption coefficient is generally achieved when an LWRT material is molded to a greater thickness, and it is believed the porosity determines, at least in part, the sound absorption performance of the LWRT material. However, the non-thermoformed EG grade material exhibited a higher sound absorption coefficient than the same material when it was molded to 4 mm thickness. This result is believed to be due to the layered structure of EG improving the sound absorption of the material. The thermoforming process may cause some level of EG expansion in the heating process, and that may be why the material molded at 4 mm shows lower acoustic performance than the material with a thickness around 3.6 mm before thermoforming. It is also noticed that significantly higher acoustic performances would be achieved in the higher frequencies, such as above 4000 Hz.

Example 5

Due to the potential applications in building and construction industry, the noise reduction coefficient (NRC) and sound absorption average (SAA) numbers of Sample A1 and A2 were tested and summarized in Table 4.

TABLE 4

| Material | NRC | SAA |
|---|---|---|
| Sample A1 | 0.85 | 0.88 |
| Sample A2 | 0.85 | 0.88 |

The samples have different surface materials facing the sound source in ASTM C423-17 tests. Sample A1 had a light weight scrim surface layer, which is considered a high open area surface layer. In contrast, the perforated film used on Sample A2 only had an open area around 10%. Sample A1 and Sample A2 exhibited the same level of acoustic performance. Therefore, it is believed that a film with about 10% surface open area is suitable to achieve the same level of acoustic performance as an open structure light weight scrim.

Example 6

The flammability performance of Sample A1, A2, A3, B1, and B2 were tested using the ASTM E84 test standard. In the ASTM E84 standard, Class A performance requires a Flame Spread Index (FSI) that is not larger than 25 and a Smoke Development Index (SDI) that is not larger than 450. The materials were tested without the thermoforming process. All the tested materials meet Class A requirements as shown in Table 5.

TABLE 5

| Material | FSI | SDI |
| --- | --- | --- |
| Sample A1 | 25 | 110 |
| Sample A2 | 20 | 60 |
| Sample A3 | 25 | 105 |
| Sample B1 | 20 | 90 |
| Sample B2 | 15 | 35 |

The flammability depended more on the substrate formulation, and the surface materials only affected the performance slightly. Between the two formulations, EG was considered a more effective FR additive, while MDH provides more color options if required by the end use application.

Example 7

Figures 26A, 26B:
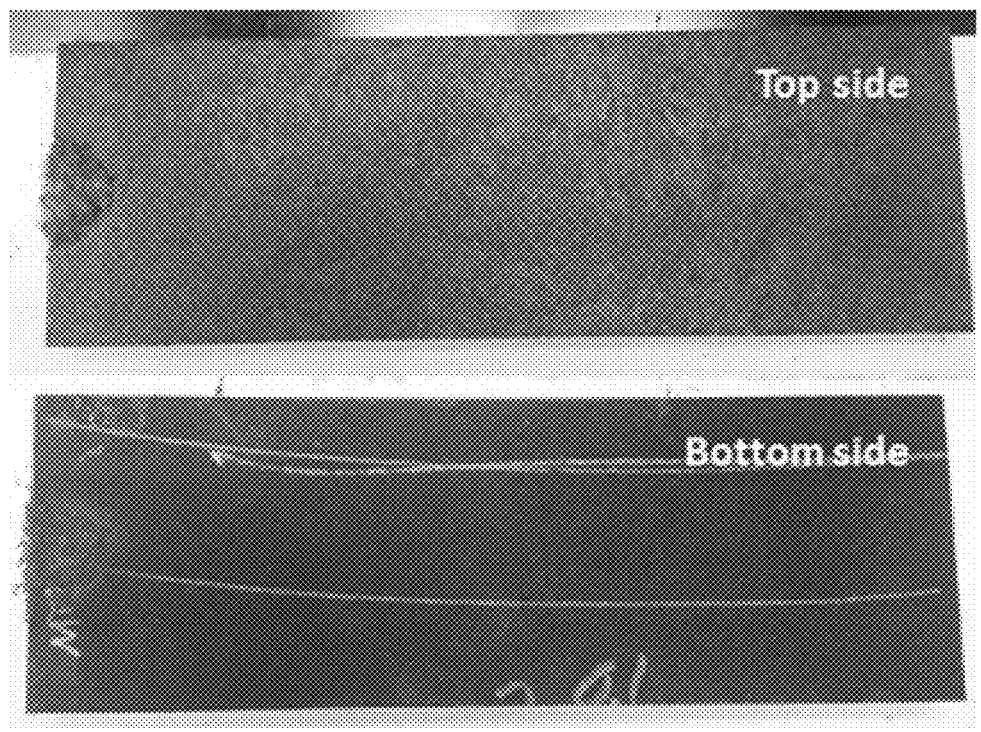
FIG. 26A is a photograph showing a top side of a specimen after flammability testing, in accordance with some examples.
FIG. 26B is a photograph showing a bottom side of a specimen after flammability testing, in accordance with some examples.

Control B and Sample B3 were also tested against SAE J369 method after being thermoformed as these materials could be used for automotive applications. Sample B3 showed the capability to self-extinguish. The molded material shows SE-0 level performances both as molded and after being soaked with motor oil for 10 minutes. FIGS. 26A (top side) and 26B (bottom side) shows an example of the specimen after flammability testing. The specimen was first soaked with 5W30 engine oil for 10 minutes and drained vertically for 20 minutes. The specimen was lit from the engine oil rich edge. It self-extinguished and as shown in FIGS. 26A and 26B, only minor damage occurred at the lighting edge.

Example 8

Figure 27:
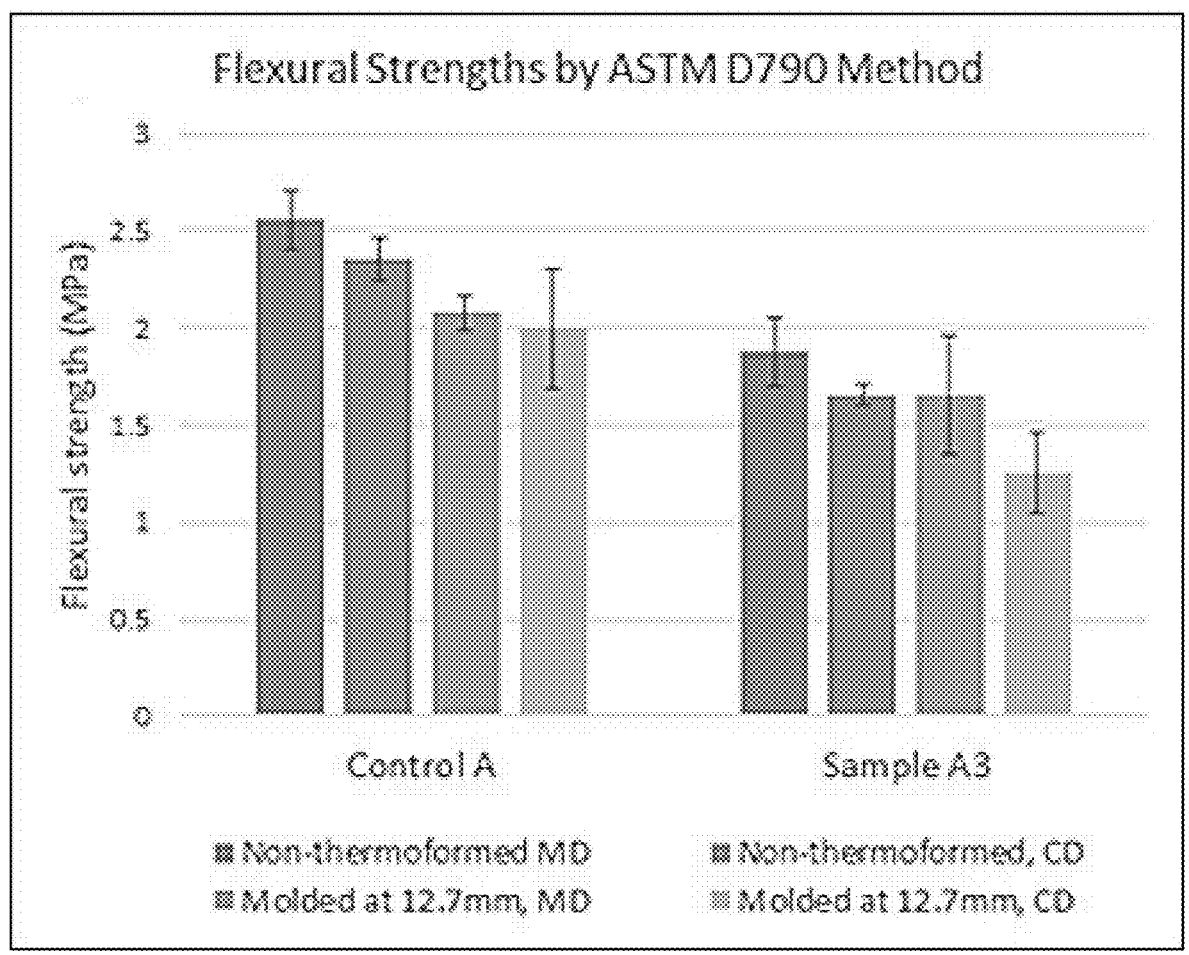
FIG. 27 is a bar graph comparing flexural strength measurements of different samples, in accordance with some examples.
Figure 28:
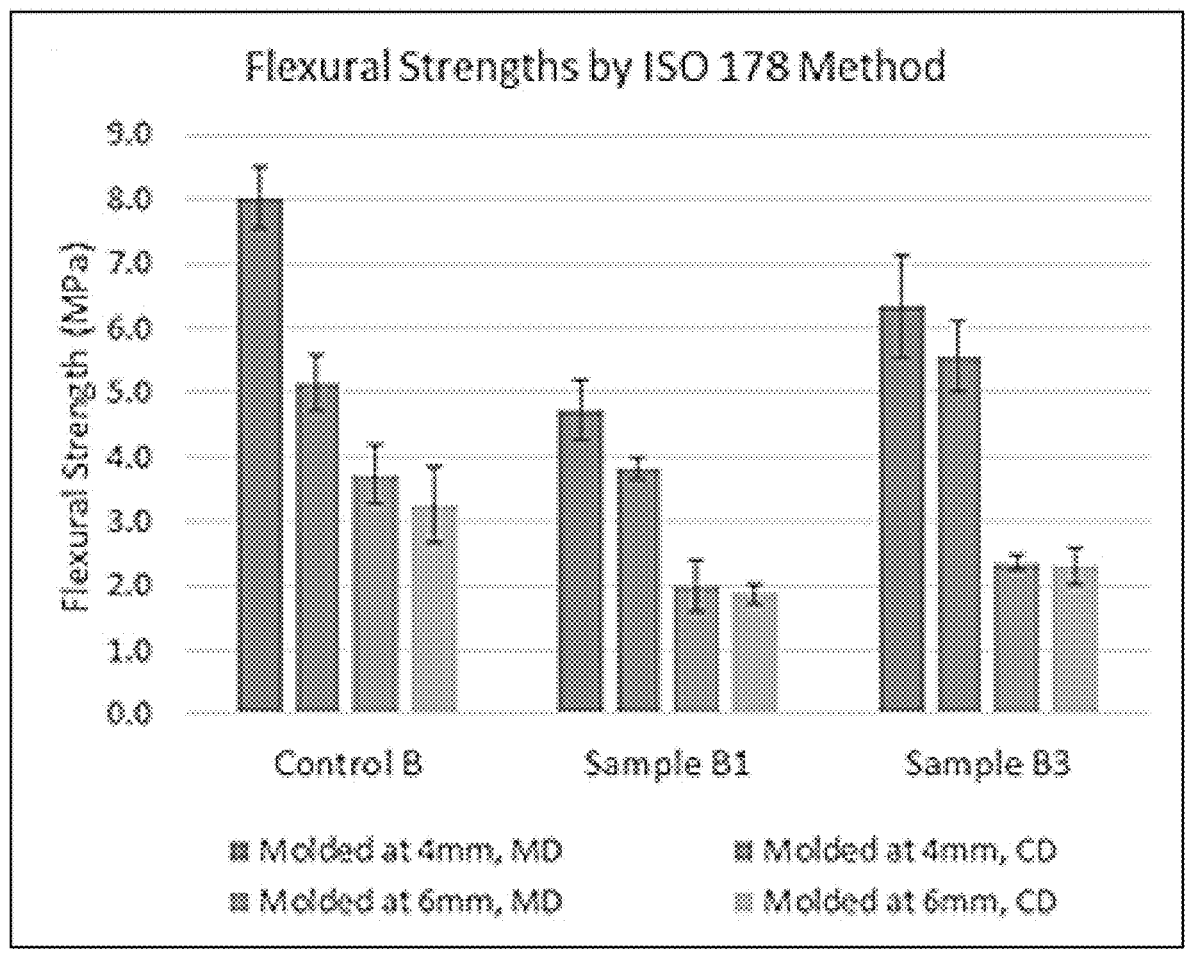
FIG. 28 is another bar graph comparing flexural strength measurements of different samples, in accordance with some examples.

Flexural strength measurements of Control A and Sample A3 are compared in FIG. 27, an FIG. 28 compares the flexural strength measurements of Control B, Sample B1, and Sample B2. The materials were tested both in the machine direction (MD) and cross-machine direction (CD). The mechanical strength of LWRT is more determined by the glass fiber and resin. Both kinds of additive are considered to generally lower the mechanical strengths of the composites. Since EG is a more effective FR additive, the flexural strength is less affected on the EG version LWRT, which could be the result of lower loading level of the additive.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. A method of producing a cubicle wall panel, the method comprising:
    adding thermoplastic materials, a flame retardant agent and a plurality of reinforcing fibers into a dispersing foam;
    depositing the added thermoplastic materials, the flame retardant agent and the plurality of reinforcing fibers in the dispersing foam onto a wire screen;
    removing foam but not the deposited flame retardant agent, the thermoplastic materials or the reinforcing fibers from the wire screen using a vacuum to provide a web;
    drying the web using heat to soften the web and form a porous core layer comprising a basis weight of at least 2500 gsm;
    depositing an open cell skin onto a surface of the porous core layer; and
    passing the porous core layer comprising the deposited open cell skin through a set of rollers to laminate the open cell skin to the porous core layer to provide a cubicle wall panel comprising a noise reduction coefficient of at least 0.5 as tested by ASTM C423-17, and wherein the cubicle wall panel comprises a flame spread index of less than 25 and a smoke development index of less than 150 as tested by ASTM E84 dated 2009.

2. The method of claim 1, further comprising selecting the open cell skin to comprise an open surface area of at least 10%.

3. The method of claim 2, further comprising adding a porous decorative layer on the open cell skin.

4. The method of claim 3, wherein the flame retardant agent comprises expandable graphite particles.

5. The method of claim 3, wherein the flame retardant agent comprises magnesium hydroxide.

6. The method of claim 1, further comprising selecting the open cell skin to be a perforated film with an open surface area of at least 10%.

7. The method of claim 6, further comprising adding a closed cell skin on a second surface of the porous core layer.

8. The method of claim 1, wherein the open cell skin comprises an open surface area of at least 10%, and wherein the cubicle wall panel comprises a noise reduction coefficient of at least 0.85 as tested by ASTM C423-17.

9. The method of claim 1, further comprising disposing a closed cell skin on a second surface of the porous core layer.

10. The method of claim 1, wherein the thermoplastic material comprises a polyolefin resin.

11. The method of claim 10, wherein the polyolefin resin is polypropylene.

12. The method of claim 1, wherein the porous core layer further comprises a clay.

13. The method of claim 1, wherein the plurality of reinforcing fibers comprise glass fibers or mineral fibers or both.

14. The method of claim 1, wherein the plurality of reinforcing fibers comprise glass fibers and the thermoplastic material comprises polypropylene.

15. The method of claim 1, wherein the flame retardant agent is homogeneously dispersed in the porous core layer.

16. The method of claim 1, wherein the open cell skin comprises an open cell perforated film.

17. The method of claim 16, wherein the open cell perforated film comprises a basis weight between 10 gsm and 150 gsm.

* * * * *